United States Patent [19]

Falzone et al.

[11] Patent Number: 4,535,444
[45] Date of Patent: Aug. 13, 1985

[54] DIGITAL SWITCHING EXCHANGE FOR TELEPHONE SYSTEMS

[75] Inventors: Vincenzo Falzone; Marcello Tommasi, both of Rome, Italy

[73] Assignee: Italtel Societa Italiana Telecomunicazioni S.p.A., Milan, Italy

[21] Appl. No.: 341,671

[22] Filed: Jan. 22, 1982

[30] Foreign Application Priority Data

Jan. 30, 1981 [IT] Italy ............................. 19414 A/81

[51] Int. Cl.³ .................. H04J 3/02; H04Q 11/04
[52] U.S. Cl. .................................... 370/58; 370/86
[58] Field of Search ............ 370/58, 42, 53, 54; 179/18 J

[56] References Cited

U.S. PATENT DOCUMENTS

| | | | |
|---|---|---|---|
| 3,794,983 | 2/1974 | Sahin | 370/54 |
| 3,889,067 | 6/1975 | Reed et al. | 370/58 |
| 4,305,148 | 12/1981 | Deglin | 370/58 |

Primary Examiner—Douglas W. Olms
Assistant Examiner—Wellington Chin
Attorney, Agent, or Firm—Karl F. Ross; Herbert Dubno

[57] ABSTRACT

A digitally operating telephone exchange or central office comprises at least one elemental switching assembly AC including a multiplicity of routing modules MII interconnected by PCM lines FII, each module communicating directly with one or more interfaces UAA, TNN, UGG which provide some of these modules with access to subscriber lines, other of these modules with access to digital trunks extending to remote exchanges, and still other modules with access to analog-type trunks. The operations of the routing modules MII and the digital-trunk interfaces TNN are controlled by a common supervisory processor SGS and are timed by a central clock CKC. A centralized oscillator GC supplies the line interfaces UAA with ringing current and with an audio-frequency carrier modulable for signalization purposes.

23 Claims, 31 Drawing Figures

| RIC | | | | | |
|---|---|---|---|---|---|
| OPTR $\emptyset$,1,2 | SGDT | NPTR $\emptyset$,1,2 | NPTR 3,4,5 | FLG RX (SFRX) | DMA (DMFL) |
| $\emptyset$ | $\neq$AA | $\emptyset$ | INV | NO | NO |
| $\emptyset$ | =AA | INC | INV | NO | YES |
| 1-6 | INDIFFERENT | INC | INV | NO | YES |
| 7 | INDIFFERENT | $\emptyset$ | INC | YES | YES |

| TRAS | | | | | |
|---|---|---|---|---|---|
| OPTR $\emptyset$,1,2 | FLTX | NPTR $\emptyset$,1,2 | NPTR 3,4,5 | FLG TX (SFTX) | DMA (DMFL) |
| INDIFFERENT | 1 | $\emptyset$ | $\emptyset$ | NO | NO |
| $\emptyset$-6 | $\emptyset$ | INC | $\emptyset$ | NO | YES |
| 7 | $\emptyset$ | $\emptyset$ | $\emptyset$ | YES | YES | fig.13

DIGITAL SWITCHING EXCHANGE FOR TELEPHONE SYSTEMS

FIELD OF THE INVENTION

Our present invention concerns a completely electronic telephone exchange or central office for switching numerically coded phonic signals.

BACKGROUND OF THE INVENTION

In every switching exchange, be it numerical (i.e. digital) or not, there are always two subsystems present:
the set of line interfaces communicating with subscribers and trunks; and
the automatic switching installation.

The first subsystem serves for adapting the line criteria to those of the switching installation while the second serves to provide temporary connection between two lines, on the basis of the processing results of the signaling information.

Exchanges of the type designed to switch numerical signals, in which the automatic switching installation is made up of a certain number of centralized units, are well known: these have a connection field designed to carry out the switching of the numerical signals on the basis of the processing of the signaling information, which is carried out by a centralized control unit.

In order to avoid inefficiency of the switching exchange due to a breakdown in one of the centralized units, these are usually duplicated; consequently, means designed to regulate the formalities of their operation "in duplicate" must be provided.

The cost of each line connected to a switching exchange of the type described is linked to that of the aforesaid centralized units and varies in relation to the capacity of the exchange (understood as the maximum traffic-handling capacity) and the number of lines actually connected.

If the switching exchange is designed to handle an amount of traffic that is not much greater than that of the lines connected to the exchange, the cost per line is not very high, but there is the inconvenience that, for a user increase exceeding the exchange capacity, it is necessary to replace the previously installed centralized units with others of greater capacity, on account of the fact that these units are not modular and therefore do not allow capacity expansion.

On the other hand, if a switching exchange with a much larger capacity than the number of lines to be connected is installed, there is no longer a saturation problem, but the cost per line is extremely high and therefore the exchange is uneconomical. Recently, in order to lower the effect of the cost of the centralized part upon the cost of the single terminations, exchanges made up of switching modules of reduced dimensions, connected by means of group stages and/or trunks, have been designed. Solutions using centralized or distributed controls but still with a hierarchial structure and duplicated elements inside the modules are well known.

Routing, in all cases, is deterministic and requires that several control units or every module be informed of the distribution of the terminals and the current status of the field of connection.

OBJECT OF THE INVENTION

The object of our present invention is to provide a numerical (digital) switching exchange whose cost is about proportional to capacity ranging from about a hundred to about ten thousand lines.

SUMMARY OF THE INVENTION

With interfaces constructed as single and independent units, the linearity of the costs of the exchange involves that of the automatic switching installation which has, therefore, been designed as a set of elementary automatic switching assemblies, each with its own field of connection and control unit that are not duplicated.

The elementary automatic switching assembly has a capacity of one hundred subscribers and thirty trunks; the overall switching installation of the telephone exchange is designed as a nonhierarchical network of identical elementary automatic switching assemblies in which there are no centralized units. We therefore provide, in accordance with our present invention, a numerical switching exchange for telecommunications systems comprising a plurality of routing modules, mutually identical and interconnected by means of PCM lines with an incomplete mesh as well as a predetermined number of access units; by "incomplete mesh" we mean the existence of only a partial direct access of the several routing modules to one another. Each of these routing modules is designed to receive, and diffuse to the modules connected to it, interconnection requests coming both from access units and from routing modules connected to it, as well as to recognize whether or not the addressed access unit is directly connected to it, signaling back the occurrence of such recognition to one of the modules from which the interconnection request has come, chosen according to a predetermined criterion, e.g. associated with the diffusion. Each routing module is also designed to carry out the switching of the digital words allocated in time slots C of incoming PCM channel groupings F (referred to hereinafter as bundles) into respective time slots of as many outgoing PCM bundles F, on the basis of the examination of the messages allocated in the signaling channels of these PCM bundles. The exchange further comprises a plurality of groups of access units relating to the subscribers, each group being connected to one of the routing modules by means of a PCM bundle, each access unit being designed to allocate the signals provided by U($<$C) active user instruments connected to it in the temporal channels of the PCM bundle of the group, as well as to carry out the corresponding operation on the PCM signals of the bundle directed in the opposite direction. Also included are a plurality of groups of access units relating to analog-type trunk lines, each group being connected to one of the routing modules by means of a PCM bundle, each of these access units being designed to allocate the signals present on G($<$C) analog-type trunk lines connected to it, in the temporal channels of the PCM message path or bundle of the group, as well as to carry out the corresponding operation on the PCM signals of the bundle directed in the opposite direction. In addition, we provide a plurality of access units relating to digital-type trunk lines, each of which is connected to at least one routing module by means of PCM bundles and is designed to carry out a synchronizing and timing operation between the input and output PCM bundles, a centralized timing-signal generator which is connected to each routing module as well as to the access units relating to the digital-type trunk lines, and finally a service or supervisory processor which is connected by means of a data channel to each routing module as well as to the access units pertaining to digital-type trunk lines.

BRIEF DESCRIPTION OF THE DRAWING

The above and other features of our invention will be made clear by the following description given with reference to the accompanying drawing in which:

FIG. 1 is a block diagram of routing module MII shown in FIG. 1;

FIG. 13 shows a truth table relating to unit PRDLG shown in FIG. 10;

SPECIFIC DESCRIPTION

Figure 1:
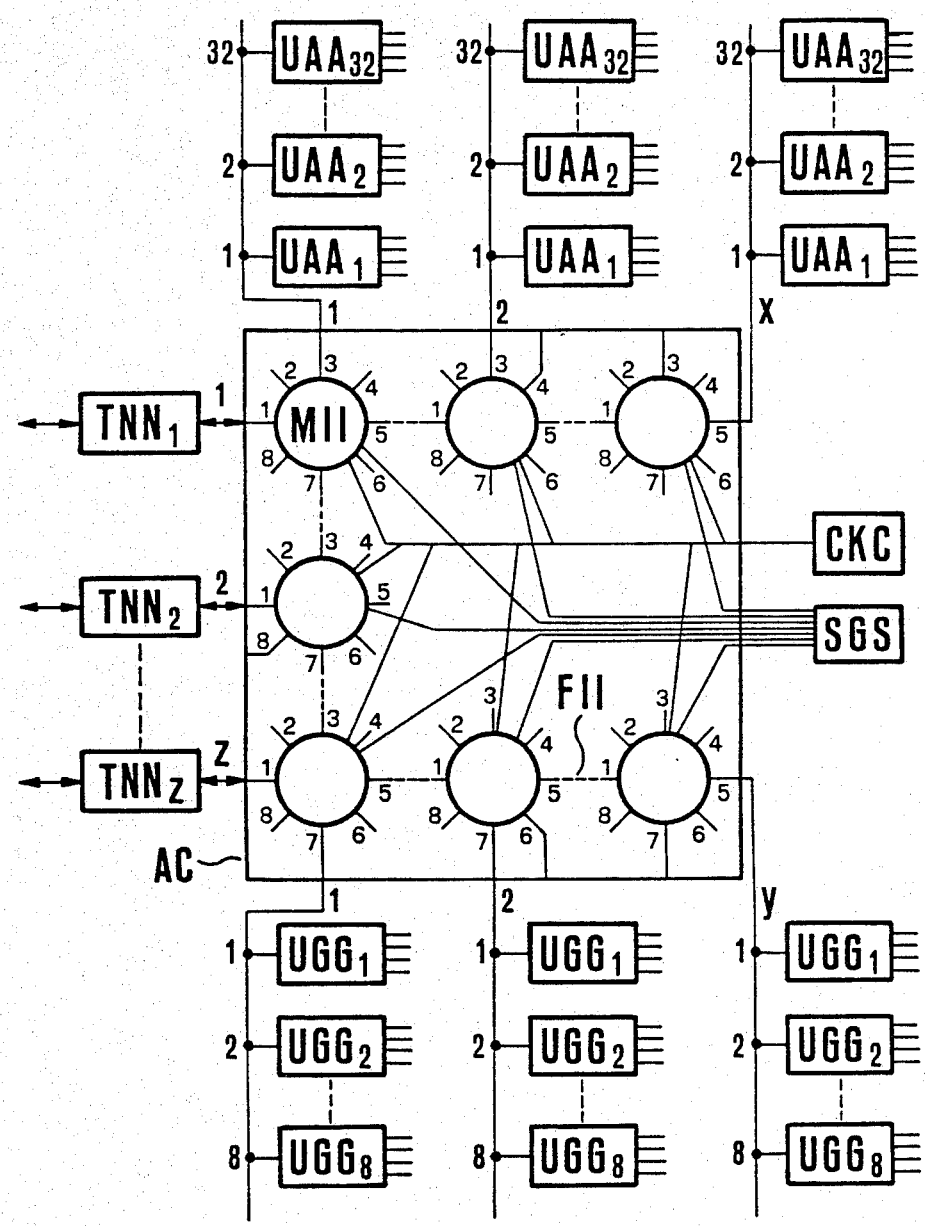
FIG. 1 is a block diagram of an exchange according to the invention.

FIG. 1 illustrates a block diagram of a switching exchange, constructed according to the invention, comprising an automatic switching assembly AC connected to a multiplicity of lines carrying signals relating to associated subscribers.

In particular, a first plurality of lines 1, 2, ..., X, pertaining to the subscriber subsets, are connected to assembly AC; to each of these lines a predetermined number (up to 64, but usually 32) of line-access units $UAA_1, \ldots UAA_{32}$ are connected.

A typical line-access unit UAA is designed to forward the signals concerning a predetermined number of subscriber subsets (for example four subsets) to the line connected to it, after having converted these signals into digital form. Therefore, on each access line there are present digital signals organized according to a frame structure differing from that of a normalized PCM system (e.g. of 2 Mbit/s) in that signal transmission is of the message type. Henceforth in this description, the term internal PCM is used to define an organization of the numerical signals according to a frame structure like the one referred to.

Furthermore, a second plurality of lines 1, 2, ... Y, pertaining to analog-type trunk lines, are also connected to assembly AC; to each of them a predetermined number (up to 64, but usually 8) of trunk-access units $UGG_1, \ldots, UGG_8$ are connected.

A typical trunk-access unit UGG is designed to forward the signals relating to a predetermined number of analog-type trunk lines (for example four such lines) to the line to which it is connected, after having converted these signals into digital form. Therefore, on each of the Y lines there are present digital signals organized according to a frame structure that is typical of out internal PCM system.

Lastly, a third plurality of lines 1, 2, ..., Z, pertaining to digital-type trunk lines, are connected to assembly AC; to these lines as many numerical-line terminals $TNN_1, TNN_2, \ldots, TNN_Z$ are connected, these being designed to carry out timing and synchronizing functions, as well as conversions of the signals from the type used in the CCITT PCM systems to that of our internal PCM system.

The automatic switching assembly AC has a multiplicity of routing modules MII, each of which is designed to carry out switching of a predetermined number of channels (for example 256 channels relating to eight 2-Mbit/s PCM channel groupings occupied by both transit traffic and terminal traffic.

It should be borne in mind that 2 PCM message paths (of the 8 PCM groupings mentioned in the example given above) are reserved for terminal traffic and are therefore connected to access interfaces (for example one of the X subscriber lines and one of the Y trunk lines), while 6 PCM channel groupings, henceforth termed routing bundles FII, are connected to other routing modules in order to provide for transit-traffic handling.

Each module MII is connected, through a data line, to a supervisory or service processor SGS, designed to carry out operational and maintenance functions, and is further connected to a centralized timing unit CKC which synchronizes the automatic switching installation.

Within assembly AC call-routing functions towards the called subscriber are carried out by modules MII according to a principle of diffusion by which connection between two line terminals depends upon the instantaneous busy status of the distribution network and is brought about with the least possible number of transits.

The diffusion principle is based upon the transmission to all modules MII of assembly AC of a routing-request message (RQII), generated by the module MII to which the calling-line terminal belongs.

The message spreads over all the routing bundles FII of the network that are not completely saturated, reaching all modules MII as long as they are connected to the originating one by an FII chain that is not completely saturated; in particular, it also reaches the module MII where the called subscriber is situated.

For a further explanation of the modalities according to which this diffusion is carried out, let us suppose that a subscriber A, connected to a generic module $MII_i$, has dialed the number of a subscriber B, whose subset is not busy, served by a different module MII, and that none of the bundles FII of the network are saturated.

Module $MII_i$ searches for subscriber B among its own subscribers' subsets and, upon not having found it:

prepares a request message RQII that is univocally identifiable;

engage a channel on each of its routing bundles FII;

transmits the request RQII to the modules MII to which it is directly connected by the associated bundles FII and which may be regarded as lying within a proximal range;

awaits a reply.

Each of the modules MII reached by the message RQII, in its turn:

checks that it has not already handled the message RQII (in this case the check always gives a negative result);

if it has already handled the message RQII it rejects it; otherwise it accepts it and memorizes the identity of the bundle FII from which it has come and of the channel reserved for the possible connection.

Each of the modules MII reached by the first diffusion of the message:

engages a channel on each of its bundles FII from which it has not accepted the request message;

transmits the request RQII to the modules MII connected to those bundles;

awaits a reply;

starts to search for subscriber B among it subscribers' subsets.

The third diffusion of request RQII is carried out by the modules MII in a range once removed from the originating module $MII_i$, in the same manner as the second diffusion just described.

In this way the routing-request message reaches all the modules MII connected to module $MII_i$ by bundles FII that are not saturated, by means of successive diffusions.

If subscriber B is connected to a module MII reached during the third diffusion, for example, then routing terminates with that third diffusion, but the diffusion process continues right up to complete saturation of the distribution network.

To sum up, then:

the message RQII has been transmitted and retransmitted until the network of bundles FII has been saturated;

each module MII, except the first one, has accepted the request message only once, and has only one upstream channel engaged for a possible connection with calling subscriber A;

on the network a certain number of channels are temporarily engaged: on each of these channels the module MII which has transmitted the request message, whether it has been accepted or not, awaits a reply;

all modules MII, except the first, are searching for subscriber B among their subscribers' subsets yet only one of them will get a positive result.

The diffusion has established in the network a minimal tree with its roots in module $MII_i$. The particular form of this tree has been determined by the order of arrival of the request messages at the individual modules but, in any case, the diffusion creates minimal trees, so that the modules of the caller and of the subscriber being called are always at a minimal distance from each other and are linked by only one path.

If a final module $MII_k$ serving subscriber B should find that subscriber set not busy, it sends a message back to originating module $MII_i$. The message may pass through several intermediate modules which receive it and then transmit it onto the engaged upstream channels of the path linking the originating and final modules.

All the modules not included in the route so established release their channels and cancel the data relating to the request messages at the end of the time limit allowed for the response.

It is to be noted that the request messages are sent only to those bundles FII that have at least one channel free. If some of these bundles are saturated, the process differs from that described by the consequent smaller diffusion of the messages through the network; however, all modules MII connected to module $MII_i$ by a chain of unsaturated bundles are reached in any case.

Let us now review the fundamental features of our invention with reference to a particular communication system:

Each elementary automatic switching assembly is able to establish connections, in a blockfree manner, between channels of eight 2.048-Mbit/second PCM lines.

The PCM system used has 30 phonic channels plus two service channels (channel No. 0, which carries a synchronizing signal, and channel No. 16, which carries message signals, associated with 30 phonic channels.

A group of n subscribers (n<256, on an average 100) has access to an elementary automatic switching assembly through a line stage (concentrator/expander) which is designed with a distributed logic and is connected to it by means of a PCM multiple constituting one of eight PCM lines terminating at that switching assembly.

A group of g trunks (g≦30) is connected to the elementary automatic switching assembly by means of a PCM multiple, constituting another of the eight PCM lines, through a special interface, again designed with a distributed logic.

Phonic analog/digital conversion, preprocessing of signals and sending of tones and signals to the lines are carried out within the interfaces, both for subscriber sets and for trunks.

Both the line stage and the trunk interface may be installed in a remote place, i.e. away from the automatic switching assembly.

The elementary automatic switching assembly manages and is informed of the status of all the terminals (subscriber and/or trunk) that are directly connected to it.

The minimum configuration of the exchange is made up of an elementary automatic switching assembly plus a line stage and a trunk interface for about one hundred subscribers and twenty analog trunks (or one PCM line). Subscribers and trunks occupy 2 of the 8 PCM lines.

The maximum configuration of the exchange (in terms of traffic and not the number of terminals) encompasses a hundred elementary automatic switching assemblies, a hundred line stages and a hundred trunk interfaces (analog and/or numerical). The exchange is established by connecting in an incomplete mesh—as defined above—the 6 PCM lines of the elementary automatic switching assemblies that are not allocated to the subscribers and trunks. Such an exchange constitutes, in effect, a nonhierarchical telecommunication network.

It is possible to provide exchanges of intermediate capacity, made up of n elementary automatic switching assemblies serving about $n \times 100$ subscribers and about $n \times 20$ trunks. In all cases the search for a free transfer path is carried out by diffusion, using the signalization channels. It is not necessary for any point of the exchange to be informed of the status of the network and/or the distribution of the terminals.

Each elementary automatic switching assembly is connected by means of a data line to a supervisory processor for carrying out all operational and maintenance functions. Each processor manages a hundred elementary automatic switching assemblies which are in some way grouped into exchanges.

Figure 2:
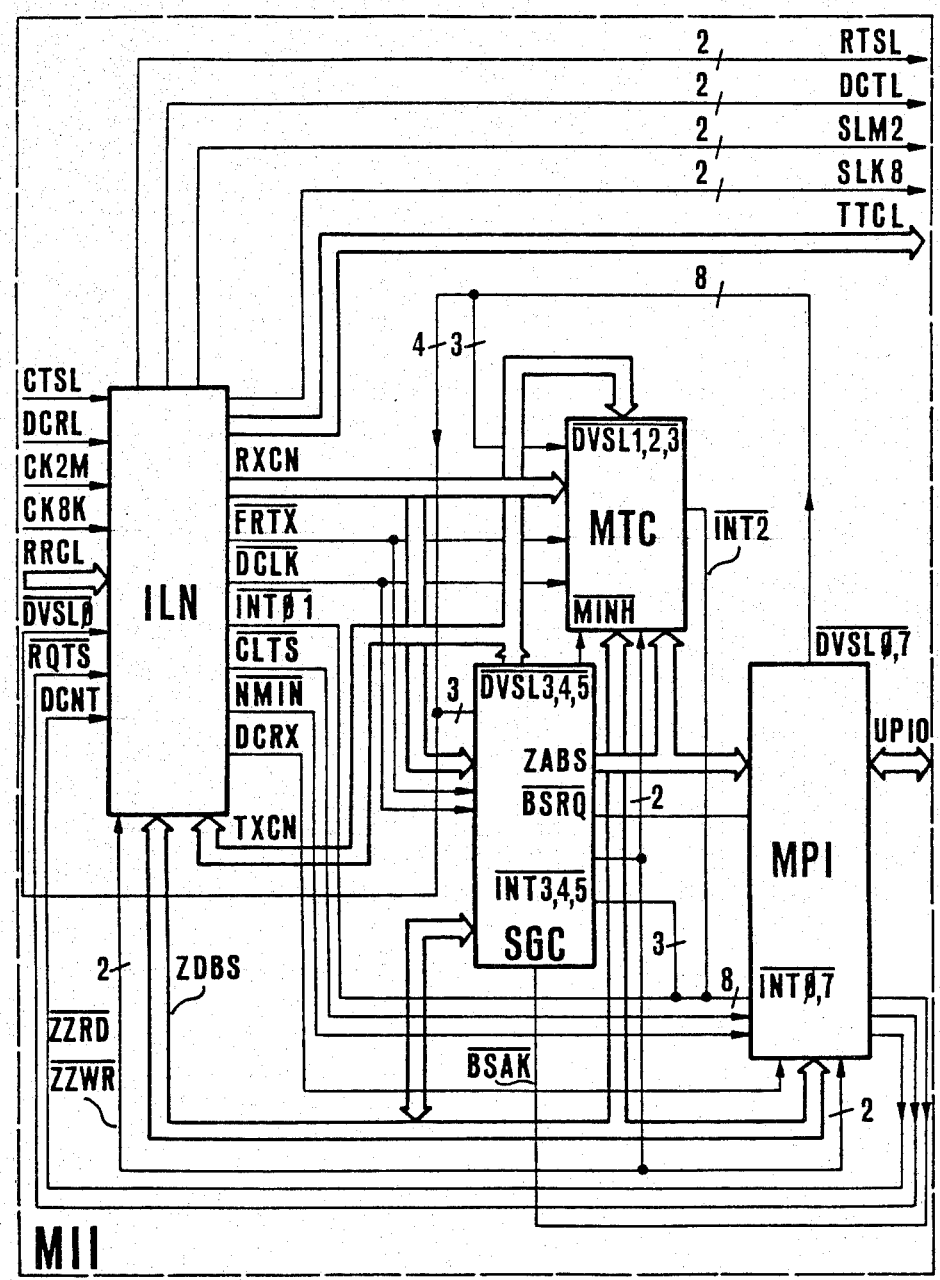

In FIG. 2 we have shown a block diagram of a generic routing module MII. In this and the following diagrams, buses have been indicated with double lines whereas the wires (or groups of wires) upon which signals and/or instructions are carried have been indicated with a single line. A short slanting stroke across such a line conventionally identifies it as a wire multiple, an accompanying numeral denoting the number of wires therein.

Switching, routing, traffic documentation and, if necessary, billing functions are carried out by this module in accordance with modalities defined by software.

The four signals CTSL, DCRL, RTSL, DCTL (Clear to Send, Data-Channel Receive, Request to Send, Data-Channel Transmit) make up the data channel of the connection with the supervisory processor SGS. Synchronizing signals CK2M and CK8K are generated by the centralized clock CKC. Synchronizing signals SLM2 and SLK8 pass to line-access units UAA and trunk-interface units UGG. RRCL and TTCL are, respectively, the eight received bundles and the eight transmitted bundles.

UPIO is a set of parallel input-output signals used for particular applications of module MII (operator-position interface, mechanical-counter control, auxiliary printer etc.) and their functions are defined by software.

Each routing module MII includes the presence of the following units:
a line-interface unit ILN;
a signaling unit SGC;
a microprocessor MPI;
a switching unit MTC.

The signals CK2M and CK8K supply unit ILN with the time bases of 2 MHz and 8 MHz, necessary for synchronous functioning of the various routing modules of the system; the modules in turn synchronize the associated interface units UAA and UGG.

Considering that signal transmission between the different modules of the system is carried out on a balanced line, unit ILN carries out the conversion of the incoming synthesizing signals at TTL level and generates, starting from these, the timing signals necessary for the operation of the module (FRTX, DCLK and the Real-Time Clock NMIN) as well as the synchronizing signals for units UAA and UGG (SLM2, SLK8).

Unit ILN receives the eight signals RRCL corresponding to bundles 0, 1, . . . , 7, converts them at TTL (transistor/transistor logic) level and introduces, bundle by bundle, such a delay time that the eight signals RXCN emitted by unit ILN derived therefrom are delayed, with respect to the nominal instant of a frame start, by exactly eight bits and are therefore synchronous with one another regardless of their respective transmission delays.

Unit ILN carries out level conversion:
from TTL to balanced signal, of the eight signals TXCN corresponding to the eight bundles transmitted (TXCN becomes TTCL);
from TTL to balanced signal, of the data signals RQTS and DCNT that become RTSL and DCTL;
from balanced signal to TTL, of signals CTSL and DCRL that become CLTS and DCRX.

Furthermore, unit ILN cyclically checks the operativeness of the level converters inserted in the reception and transmission bundles, signaling any anomalies or irregularities to the controlling microprocessor MPI of module MII.

The signaling unit SGC extracts the character which corresponds to the signalization time slot No. 16 from each bundle of signals RXCN and searches for any message-synchronizing bytes. It must be borne in mind that each signalization message (for example busy criterion) is transmitted with 8 bytes allocated in the 16th channel of 8 consecutive frames. The first byte has a characteristic configuration and constitutes the message-synchronizing byte.

If unit SGC picks up the presence of that byte, it transfers the byte itself and the following seven into the memory of microprocessor MPI through successive DMA accesses (Direct Memory Access) and then alerts unit MPI to the transfer that has been made. If unit MPI already has one or more signalization messages ready in its memory to be transmitted and sent to units UAA, UGG or to other routing modules, unit SGC allocates them in 8 successive signalization time slots (No. 16) on bundles TXCN through successive Direct Memory Accesses in unit MPI.

Furthermore, unit SGC inserts the frame-synchronizing character in the No. 0 time slot of each output bundle: during character insertion by unit SGC (time slots Nos. 0 and 16) the output circuits of the switching unit or matrix MTC are inhibited by a signal $\overline{\text{MINH}}$ generated by unit SGC.

Signalizer SGC has a test circuit that checks, cyclically, that the byte present in the 16th time slot of a channel coincides with the one actually extracted and transferred in unit DMA (and vice-versa); in the case of a failure, unit SGC alerts unit MPI by means of an interrupt request $\overline{\text{INT3}}$.

The switching unit MTC is a matrix capable of switching 256 input channels onto 256 output channels, with channels organized into 8 time-division bundles of 32 channels per bundle; the switching operation is controlled through hardware by an image memory written by unit MPI.

Unit MTC also has a test circuit that verifies coincidence between input bytes and output bytes from the switching matrix, according to the image provided by the control memory: any anomalies are signaled to microprocessor MPI through the interrupt request $\overline{INT2}$.

The controlling microprocessor MPI carries out all the necessary functions for the operation of module MII and, in particular:

it recognizes and handles the received messages one by one;

it establishes and handles the various time-outs;

it controls the real-time calendar-clock;

it controls the execution of conversations;

it controls the program for supervising the equipment and the system;

it dialogues with the supervisory processor.

The interface linking microprocessor MPI with the rest of the equipment is made up of the two data and address buses ZDBS, ZABS, the various interrupt commands coming from the several modules MII, the DMA control signals $\overline{BSAK}$ and BSRQ included among the signals concerning the data channel, the I/O selection signals $\overline{DVSL\emptyset}$ ... $\overline{DVSL7}$, and the read and write signals $\overline{ZZRD}$ and $\overline{ZZWR}$.

Figure 3:
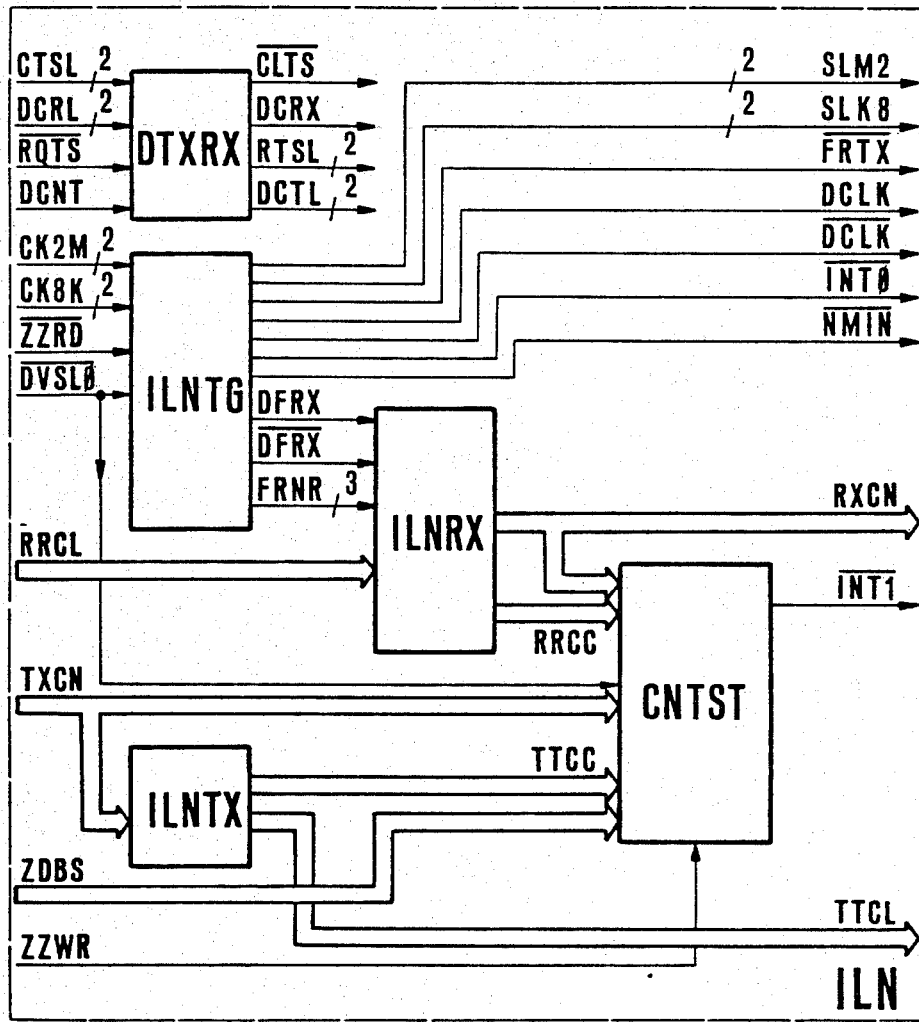
FIG. 3 is a block diagram of unit ILN shown in FIG. 2.

Line interface ILN, illustrated in greater detail in FIG. 3, has the following functional blocks:

a local timing unit ILNTG;

a unit ILNTX designed to receive the TTL-level signals and convert then into balanced signals;

a unit ILNRX designed to receive the PCM signals as balanced signals and convert them into TTL level;

a unit DTXRX designed to convert the signals present on the data channel from TTL level to balanced signals, and vice-versa;

a control or monitoring unit CNTST.

Figure 4:
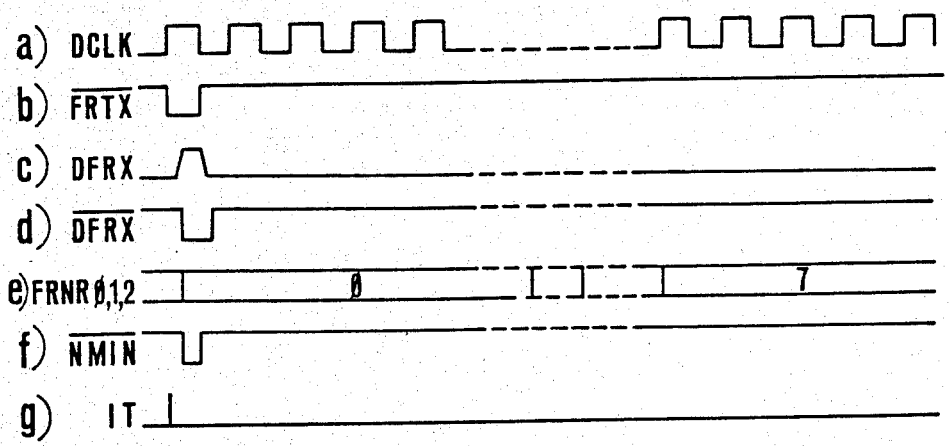
FIG. 4 shows waveforms relating to the circuit of FIG. 3.

Referring to the block diagram of FIG. 3 and the temporal diagram of FIG. 4, the operation of interface ILN may be summarized as follows:

Unit ILNTG receives the synchronizing signals CK2M and CK8K from the centralized clock (CKC) as balanced signals; after having converted them to TTL level it generates, on the basis of these received signals, the equipment-synchronizing signals $\overline{FRTX}$, $\overline{DCLK}$ and DCLK, $\overline{NMIN}$, $INT\emptyset$, and the internal timing signals DFRX, $\overline{DFRX}$, FRNR. Signal $\overline{FRTX}$ (graph b) is a frame-resetting pulse which coincides with the first half bit of the frame in transmission. Signal DCLK (graph a) is the 2.048-Mbit/s. clock signal (with ascending transition at the beginning of the bit time). Signal $\overline{NMIN}$ (graph f) is a pulse of about 200 nsec. duration with a 2-msec. repetition frequency which constitutes the time base for the real-time counting of the routing module. Signal $INT\emptyset$ is usually deactivated and is activated only if, through a malfunction, the controlling microprocessor MPI does not properly receive the pulse $\overline{NMIN}$ and does not signal its acquisition through the combination of the signals $\overline{DVSL\emptyset}$ and $\overline{ZZRD}$. The internal timing signals $\overline{DFRX}$ and DFRX (graphs c and d) are 244-nsec. pulses present in every frame and lagging with a slight delay (50 nsec.) with respect to the frame-start instant IT (graph g). At $FRNR\emptyset,1,2$ (graph e) we have represented a digital word that indicates a number between 0 and 7 which is incremented with each frame. Unit ILNTG also provides the balanced synchronizing signals SLM2 and SLK8 for use by the line-access and trunk modules.

Unit ILNTX receives the 8 TTL-level signals TXCN and converts them into the corresponding balanced signals TTCL. Each signal TTCL is reconverted to TTL level by a local receiver and the 8 resultant control signals are called TTCC.

Unit ILNRX receives the 8 balanced signals RRCL and converts each of them to TTL level emitted on two outputs, thus giving rise to two groups of signals; the signals of the first group, delayed so as to bring the start of a frame (indicated in FIG. 4 by IT) into coincidence with the beginning of the 9th bit of the transmission-timing signal, appear at one output as RXCN while those of the second or control group appear as RRCC on the other output.

Unit CNTST cyclically examines, upon instruction from the microprocessor MPI, one of the 32 signals (RXCN, RRCC, TXCN, TTCC) and, if it does not pick up signal transitions, generates an alarm interrupt signal $\overline{INT1}$.

Unit DTXRX converts the data-channel signals $\overline{RQTS}$ and DCNT (Request to Send, and Data-Channel Transmit) from TTL level into balanced signals RTSL and DCTL, and the signals CTSL and DCRL (Clear to Send and Data-Channel Receive), from balanced mode into TTL-level signals $\overline{CLTS}$ and DCRX.

Figure 5:
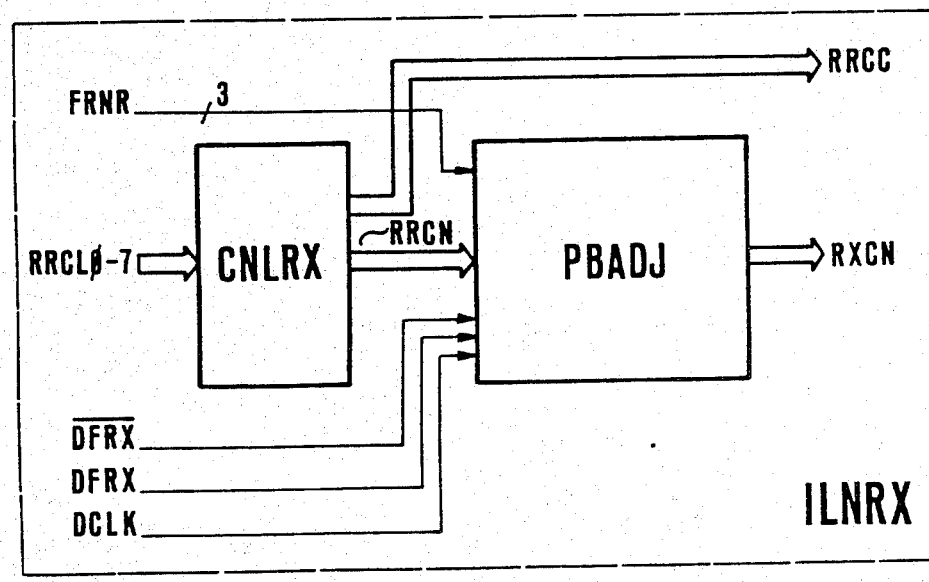
FIG. 5 is a block diagram of unit ILNRX shown in FIG. 3.

In FIG. 5 the block diagram of the functional unit ILNRX is illustrated.

The balanced signals $RRCL\emptyset$, ..., 7 are received and converted to TTL level by principal receivers and control receivers of a circuit CNLRX: thus the main signals RRCN and the control signals RRCC are generated.

The signals RRCL, generated by units UAA and UGG and other routing modules of the system, show, with respect to the nominal start-of-frame instant, different delays depending both upon the distance and the delays of the transmission and reception circuits. It is assumed that, in any case, the total delay is not more than eight clock intervals ($488 \times 8$ nsecs.$=3.9$ $\mu$secs.) which, for propagation on an unscreened symmetrical pair, corresponds to about 220 meters.

In order to avoid this inconvenience, the signals RRCL converted into the corresponding RRCN signals are fed into a circuit PBADJ which cyclically examines the signals RRCN, one at a time and, if necessary, introduces first a fraction of a bit delay aligning them with the front of the timing pulses DCLK, and subsequently samples them cyclically on the ascending front of pulses DCLK and introduces, signal by signal, a delay equal to a whole number of bits (up to 7 bits), in order to obtain signals RXCN with coinciding frame-start instants; for this purpose it uses the signal DFRX.

In a preferred embodiment the signals RXCN have the start of time slot No. 31, rather than the start of time slot No. 0. in coincidence with the instant of frame start. In other words, the signals RXCN are delayed by one time slot with reference to the instant IT.

Figure 6:
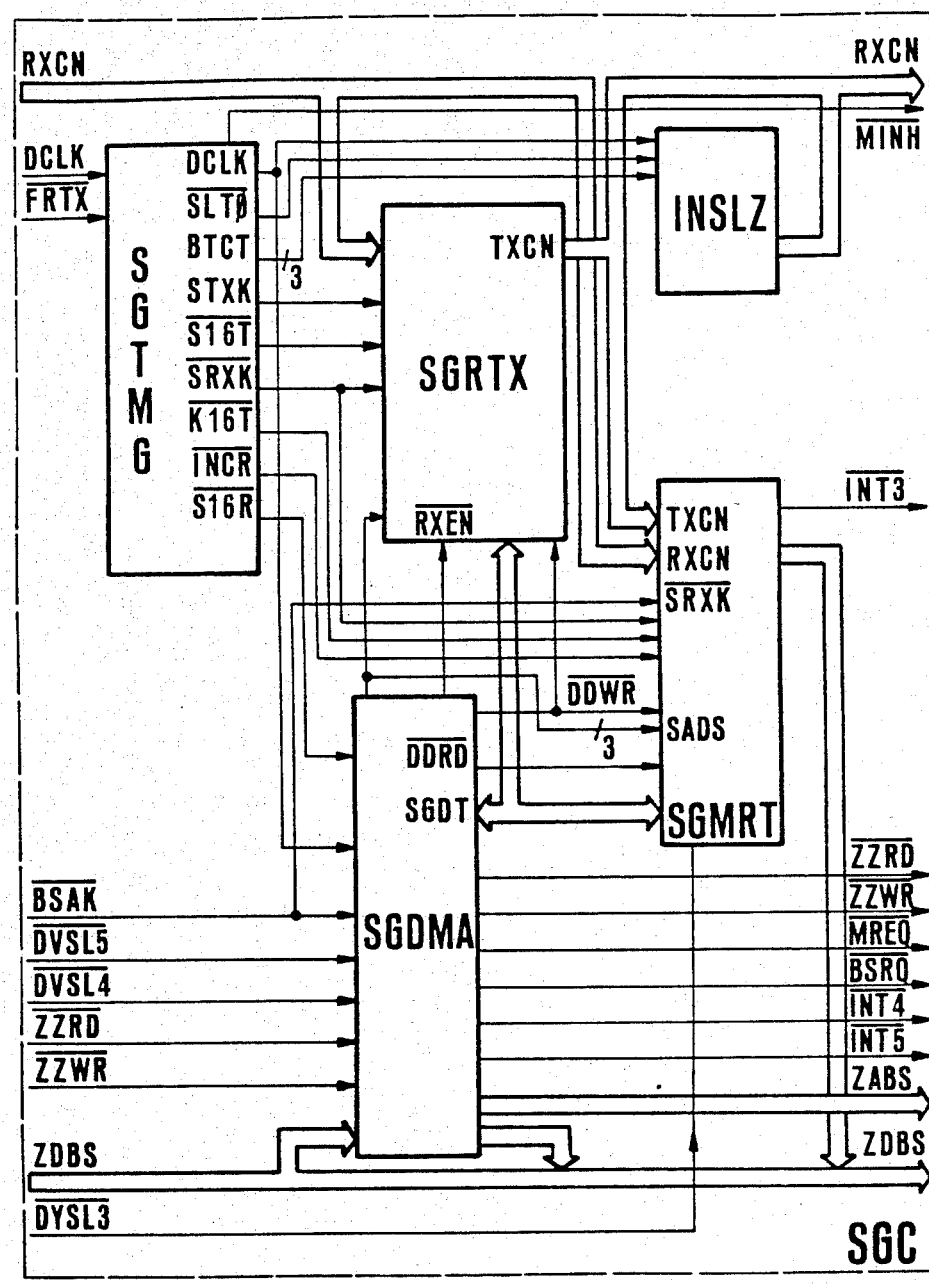
FIG. 6 is a block diagram of unit SGC shown in FIG. 2.

The signaling unit SGC, shown in FIG. 6, extracts from each of the bundles RXCN, carrying the entering PCM signals, the character corresponding to signalization time slot No. 16 and searches for any synchronizing bytes (AAH). If it finds such a byte, it transfers the byte itself and the following seven bytes to the memory of the microprocessor MPI through successive Direct Memory Accesses and then alerts the microprocessor to the transfer that has been caried out. If unit MPI has one or more messages ready in its memory to be transmitted, unit SGC transmits them on each of the outgoing bundles TXCN through successive direct accesses of the memory of unit MPI. Unit SGC also inserts the frame-synchronizing character into time slot No. 0 of each outgoing bundle; during these character insertions by synthesizer SGC (time slots Nos. 0 and 16), the output circuits of the switching matrix MTC are inhibited by signal $\overline{\text{MINH}}$ which is generated by the signalizer SGC.

As stated above, a test circuit of unit SGC cyclically verifies that the byte present in the 16th time slot of a channel coincides with the one that has actually been extracted and transferred through DMA (and vice-versa); in the case of a fault, unit SGC alerts unit MPI by means of the interrupt request INT3.

Referring to the block diagram of FIG. 6, the operation of signalizer SGC may be summarized as follows:

Circuit SGTMG receives the equipment-timing signals DCLK and $\overline{\text{FRTX}}$, and generates the internal timing signals of the module (DCLK, $\overline{\text{SLT0}}$, BTCT, STXK, $\overline{\text{S16T}}$, $\overline{\text{SRXK}}$, $\overline{\text{K16T}}$, INCR, $\overline{\text{S16R}}$) and the matrix-inhibiting signal $\overline{\text{MINH}}$ (active only during time slots Nos. 0 and 16).

Circuit INSLZ inserts the frame-synchronizing character into time slot No. 0 of each channel.

Circuit SGRTX detects the signalization characters present in the 17th time slot of channels RXCN and inserts in the 16th time slot of the TXCN channels the signalization characters to be transmitted; reading of the incoming characters and writing of the outgoing characters in this circuit is carried out by circuit SGDMA through the control signals $\overline{\text{RXEN}}$, SADS, $\overline{\text{DDWR}}$, and by means of bus SGDT.

With reference to the preceding description of circuit PBADJ, which is part of unit ILN, it is to be remembered that time slot No. 31 of the incoming channels corresponds to time slot No. 0 of the timing signals of module MII; the signalization time slot No. 16, pertaining to the incoming channels, corresponds to time slot No. 17 of the timing signals of the module. This slip is not to be found in the outgoing channels as these are timed by the module clock.

Circuit SGDMA carries out the reading in parallel of the signalization characters received by circuit SGRTX, as well as the possible transfer thereof, through DMA, to the memory of the microprocessor MPI. Any signalization characters to be transmitted are transferred to circuit SGRTX, through circuit SGDMA, from the memory of the microprocessor. As soon as the transfer of a complete signalization message, in transmission or in reception, has been completed, circuit SGDMA alerts the control microprocessor by means of the interrupt requests $\overline{\text{INT4}}$ (reception) and $\overline{\text{INT5}}$ (transmission).

A test circuit SGMRT verifies, cyclically, that transfer of data in parallel form, to or from circuit SGRTX, coincides with the character actually present in series form on channels RXCN and TXCN.

If they do not coincide, circuit SGMRT alerts microprocessor MPI by means of the interrupt request $\overline{\text{INT3}}$.

Figure 7:
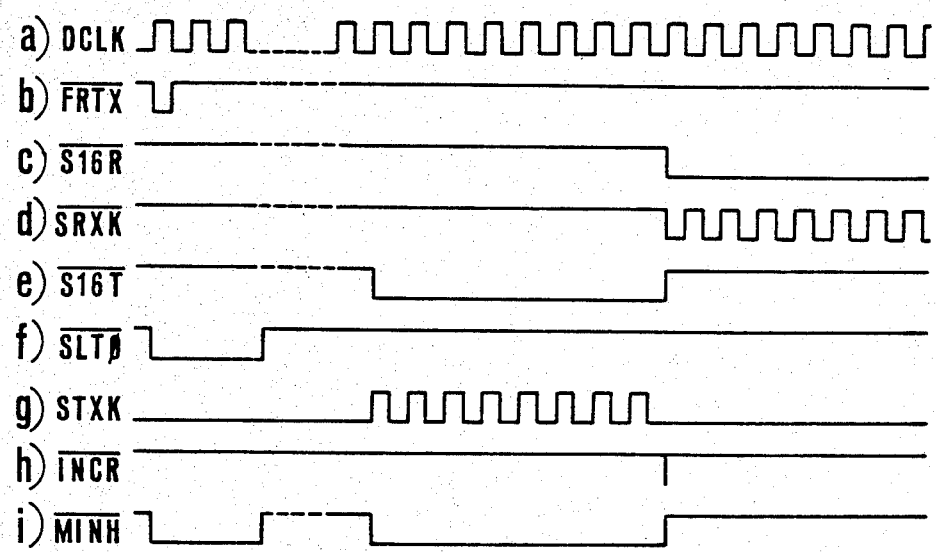
FIG. 7 shows waveforms relating to unit SGTMG shown in FIG. 6.

The operation of the timing circuit SGTMG will now be described with reference to the waveforms shown in FIG. 7, where:

graph a shows the timing signals DCLK of the module;

graph b shows the frame-resetting signal $\overline{\text{FRTX}}$;

graph c shows a temporal window $\overline{\text{S16R}}$ generated in a well known manner in response to time slot No. 17 of the module timing;

graph d shows the bit timing $\overline{\text{SRXK}}$ relating to time slot No. 17;

graph e shows a temporal window $\overline{\text{S16T}}$ generated in response to the 16th time slot of the frame;

graph f shows a temporal window $\overline{\text{SLT0}}$ generated in response to time slot No. 0 of the module timing;

graph g shows the bit timing of the transmission of signalization STXK and of the reception of the transmitted signalization $\overline{\text{K16T}}$;

graph h shows a pulse $\overline{\text{INCR}}$ that coincides with the end of signal $\overline{\text{S16T}}$;

graph i shows the signal $\overline{\text{MINH}}$ presenting two temporal windows respectively generated in response to time slot No. 0 and time slot No. 16 of the module timing.

Figure 8:
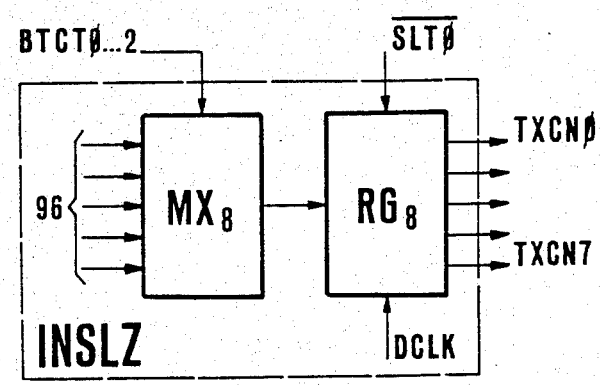
FIG. 8 is a block diagram of unit INSLZ shown in FIG. 6.

In FIG. 8 we have illustrated in detail the circuit INSLZ serving to insert the frame-synchronizing word into time slot No. 0 of each channel. In a schematic form of realization, this word 96 is wired to the input of a multiplexer MX$_8$ that receives at its control inputs the signals BTCT$\emptyset$, . . . , 2 generated by the timer SGTMG and whose output is connected in parallel to 8 registers RG$_8$ (one for each channel) which are caused to advance by the timing signal DCLK and are enabled in time slot No. 0 by signal SLT$\emptyset$ emitted by circuit SGTMG. In this manner the frame-synchronizing word is available at the outputs TXCN$\emptyset$, . . . , TXCN7 of each register.

Figure 9:
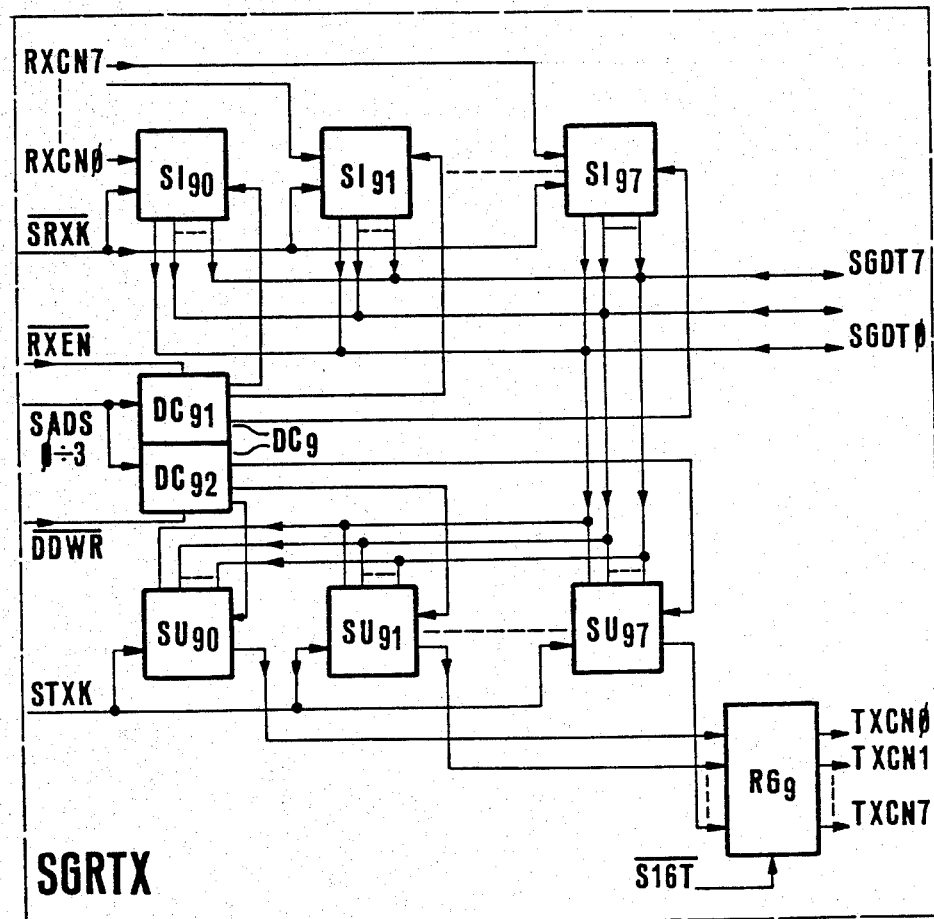
FIG. 9 is a block diagram of unit SGRTX shown in FIG. 6.

In FIG. 9 a preferred embodiment of circuit SGRTX for the reception and transmission of the signalization messages is illustrated.

The messages present on each of the 8 incoming PCM channels RXCN$\emptyset$, . . . , RXCN7 reach the series inputs of as many input shift registers SI$_{90}$, . . . , SI$_{97}$ where they are written by the clock $\overline{\text{SRXK}}$. Furthermore a decoding unit DC$_9$ receives the addresses SADS$\emptyset$, . . . , SADS2 supplied by circuit SGDMA; the first section DC$_{91}$ of this decoder sequentially enables registers SI to transfer their contents to circuit SGDMA through lines SGDT$\emptyset$, . . . , SGDT7 of bus SGDT when signal $\overline{\text{RXEN}}$ is active.

In the same way, the messages to be emitted by circuit SGDMA reach the output shift registers SU$_{90}$, . . . , SU$_{97}$ through the lines SGDT$\emptyset$, . . . , SGDT7; these shift registers are sequentially enabled for writing by the second section DC$_{92}$ of decoder DC$_9$ when signal $\overline{\text{DDWR}}$ is active.

The readout of the contents of registers SU is controlled by clock STXK and the messages relating to each channel reach a complex of registers RG$_9$ which are enabled by signal $\overline{\text{S16T}}$ and at whose outputs the eight outgoing PCM channels TXCN$\emptyset$, . . . , TXCN7 are present.

Figure 10:
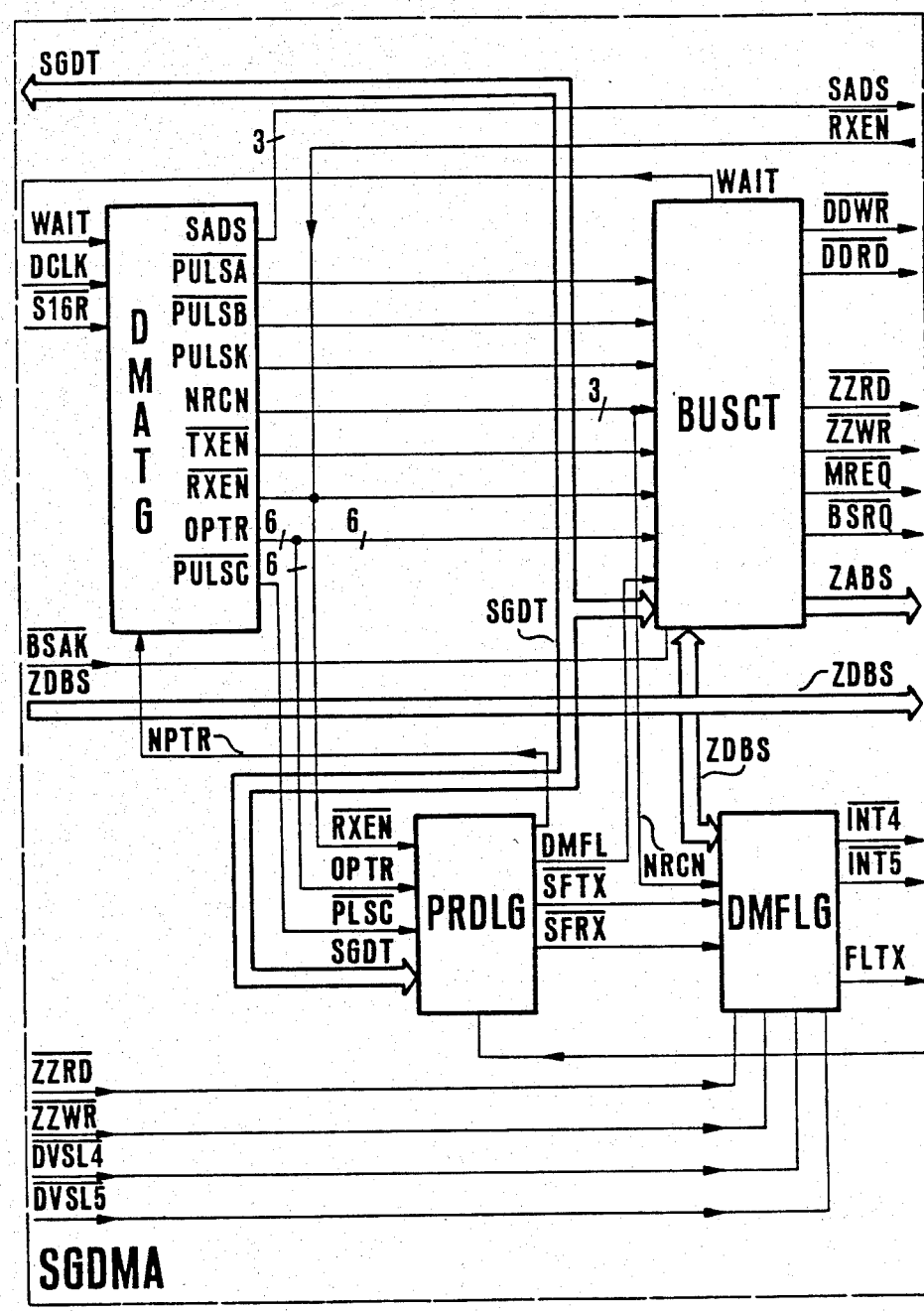
FIG. 10 is a block diagram of unit SGDMA shown in FIG. 6.

In FIG. 10 the block diagram of unit SGDMA (Signaling Direct Memory Access) is illustrated; this unit carries out the transfer of the signalization characters between the receiving and transmitting unit SGRTX and the memory of microprocessor MPI. The selection signals SADS and $\overline{\text{RXEN}}$ specify the channel (SADS) and the direction of transfer (RX or TX). The strobe signal $\overline{\text{DDWR}}$ carries out writing of data in unit SGRTX. The signalization characters are transferred through bus SGDT.

Unit SGDMA comprises the following subunits:

a first subunit DMATG which generates the DMA cycle timing and contains the DMA writing and reading addresses for each of the eight channels in a RAM-Type memory;

a second subunit PRDLG which, on the basis of the present value of the address, the status of the transmission flags, the character received on bus SGDT, establishes the future value of the address and determines whether or not to run a DMA cycle and whether or not to activate the signaling flags RX or TX to indicate, respectively, the executed reception or transmission of a complete message;

a third subunit BUSCT which carries out the function of interfacing with microprocessor MPI: if subunit PDRLG communicates to subunit BUSCT through the signal DMFL that it is necessary to run a DMA cycle, subunit BUSCT does so (in writing or reading according to the status of signals $\overline{\text{RXEN}}$, $\overline{\text{TXEN}}$ at the address obtained by combining the number of the channels served at that moment (NRCN), the address (OPTR) and the reading or writing condition;

a fourth subunit DMFLG which detects the flags RX and TX: if there is at least one flag (RX or TX), subunit DMFLG sends an interrupt request ($\overline{\text{INT4}}$ or $\overline{\text{INT5}}$) to the processor; until the latter has prepared a new message to be transmitted, subunit DMFLG inhibits the transmission of an already generated message through the signal FLTX.

Figure 11:
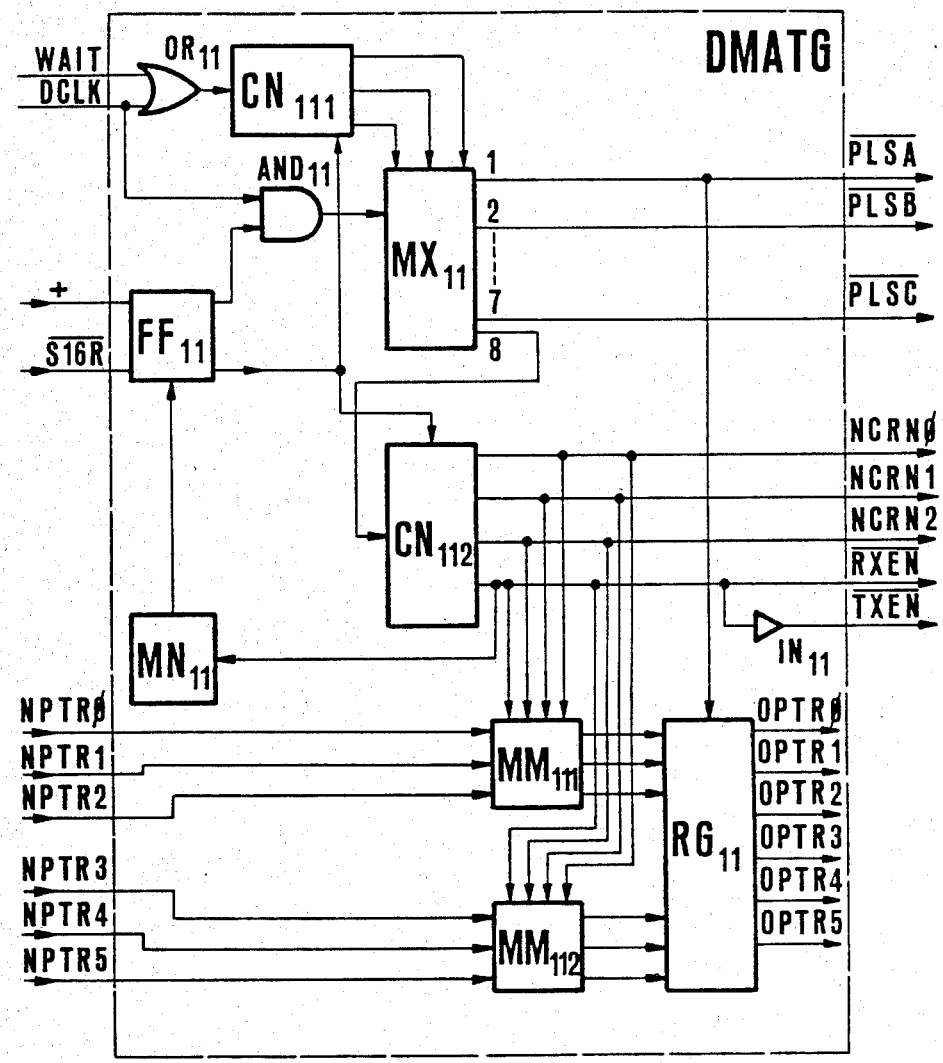
FIG. 11 is a block diagram of unit DMATG shown in FIG. 10.

The first subunit DMATG, designed to generate the DMA cycle timing and the DMA reading and writing signals for each of the 8 channels, is illustrated in detail in FIG. 11. It comprises an OR gate $OR_{11}$ to which is fed a timing signal DCLK as well as a WAIT signal from the third subunit BUSCT. The output signal of gate $OR_{11}$ reaches the counting input of a first counter $CN_{111}$ which is caused to advance by the pulses DCLK and stops its counting cycle in the presence of the WAIT signal so as to allow a DMA cycle to be run. The output signals of counter $CN_{111}$ reach the addressing input of a multiplexer $MX_{11}$ into which the timing pulses DCLK are fed through an AND gate $AND_{11}$ which receives on a second input the output signal of a bistable circuit or flip-flop $FF_{11}$; this flip-flop is set by the signal $\overline{\text{S16R}}$ whcih is active in the presence of time slot No. 16 of each PCM system.

Figure 12:
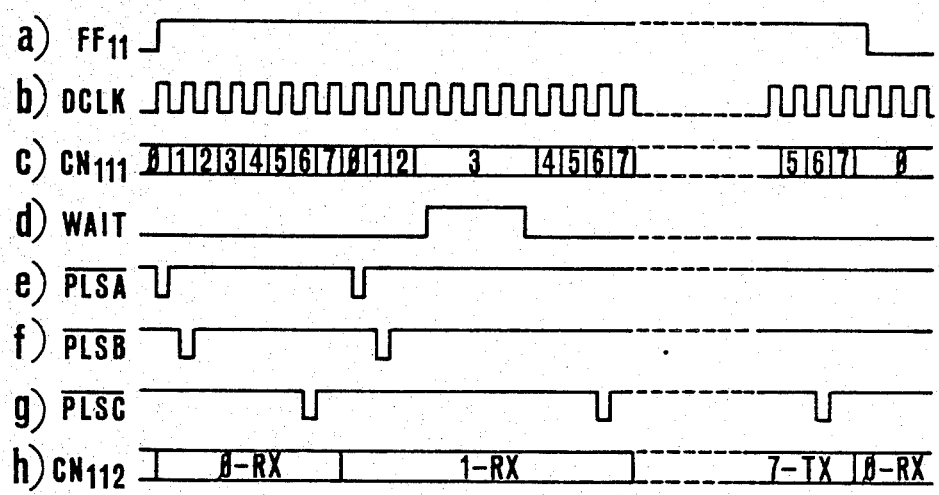
FIG. 12 shows waveforms relating to unit DMATG shown in FIG. 11.

Multiplexer $MX_{11}$ is designed to distribute the sequence pulses DCLK on 8 outputs, thus generating the pulses $\overline{\text{PLSA}}$, $\overline{\text{PLSB}}$, $\overline{\text{PLSC}}$ illustrated in FIG. 12 in graphs e, f, g.

FIG. 12 also illustrates in graph d the WAIT signal, in graph c the count read out from device $CN_{111}$, in graph b the timing-pulse sequence DCLK, and in graph a the output signal of flip-flop $FF_{11}$.

The last output signal from multiplexer $MX_{11}$ reaches the counting input of a four-stage counter $CN_{112}$ whose output signals are sent on to the addressing input of a pair of random-access memories $MM_{111}$ and $MM_{112}$ which receive on their data inputs, respectively, the signals NPTR$\emptyset$, ..., NPTR2 and NPTR3, ..., NPTR5.

The output signals of these two memories are fed to a complex of registers $RG_{11}$ which stores the binary configuration present on its inputs in the presence of pulse $\overline{\text{PLSA}}$; the signals present at the outputs of the register complex $RG_{11}$ are henceforth indicated as OPTR$\emptyset$, ..., OPTR5.

The three least-significant outputs of counter $CN_{112}$ identify the number of the PCM system under control and their signals are henceforth indicated with NCRN$\emptyset$, ..., NCRN2, whereas the most-significant output generates the enabling signals for a DMA writing phase ($\overline{\text{RXEN}}$ signal) and, respectively, a DMA reading phase ($\overline{\text{TXEN}}$), the latter by means of an inverter circuit $IN_{11}$.

The most-significant output signal of counter $CN_{112}$ is also fed to a monostable circuit of monoflop $MN_{11}$ which generates a resetting pulse for flip-flop $FF_{11}$, disabling the counters $CN_{111}$ and $CN_{112}$.

As far as the DMA cycle is concerned, it must be borne in mind that the microprocessor's memory receiving the signalization messages includes 8 storage areas, each associated with a respective PCM channel; a generic memory area is divided into 8 sections, each designed to contain 8 bytes. Signals NCRN$\emptyset$, ..., NCRN2 identify the memory area concerned with carrying out a DMA cycle, whereas signals OPTR$\emptyset$, ..., OPTR2 address the byte to the section concerned, which is identified by signals OPTR3, ..., OPTR5.

The organization of the microprocessor memory described above concerns the carrying out of writing functions in DMA. Processor MPI is also designed to create messages to be transmitted, likewise in DMA; for this purpose the memory of processor MPI comprises a zone destined to contain these messages. In a preferred form of realization that outgoing-message zone includes only one 8-byte section for each channel; however, we may provide the memory for outgoing messages with a structure similar to that described above for messages to be received.

If the memory area for the messages to be transmitted includes only one section per channel, signals NCRN3, ..., NCRN5 are constantly at zero in the reception phases.

FIG. 12 shows furthermore that, in the time interval during which the signal illustrated in graph a remains active, 8 DMA cycles in reception ($\emptyset$-RX, ..., 7-RX) as well as 8 DMA cycles in transmission ($\emptyset$-TX, ..., 7-TX) are run, as is illustrated in graph h.

FIG. 13 illustrates a truth table designed to explain the functioning of the second subunit PRDLG which as a rule may be realized through a read-only memory (ROM) or similar equipment.

The signals OPTR indicating the memory address in microprocessor MPI at which the last byte of a message has been written/read, as well as the signals $\overline{\text{RXEN}}$ indicating whether or not a write/read function in DMA is being carried out, are supplied to unit PRDLG emiting the signals NPTR indicating the address at which the successive byte shall be written/read.

Since each message begins with a byte containing a predetermined configuration, indicated in FIG. 13 by AA, the signals present on bus SGDT connected to the unit SGRTX (FIG. 6) are fed to unit PRDLG so as to allow the presence of the start-of-message configuration to be picked up.

The signals $\overline{\text{PLSC}}$, provided by subunit DMATG, as well as the signal FLTX sent by microprocessor MPI to inhibit DMA in transmission (when necessary), are also fed to subunit PRDLG. Furthermore, the signals DMFL (request to carry out a function in DMA) and $\overline{\text{SFTX}}$ and $\overline{\text{SFRX}}$, which indicate to the microprocessor that the transmission/reception of and 8-byte message has been completed, are available on the output of subunit PRDLG.

With reference to FIG. 13, the first table RIC concerns DMA in reception whereas the second table TRAS concerns DMA in transmission. In the first two columns the status of the inputs has been indicated, in the following four the status of the outputs. Referring, for example, to the second line of the first table, presuming that the word AA is present on the first byte of the message, the three least-significant bits of the address NPTR$\emptyset$, ..., NPTR2 are incremented (INC) whereas the most-significant bits of that address (NPTR3, ..., NPTR5) are not varied (INV). The signal SFRX is not activated (since transmission of a message is not finished) whereas the signal DMFL is activated as the recognized byte has been considered valid and so is transferred into the memory of processor MPI.

Figure 14:
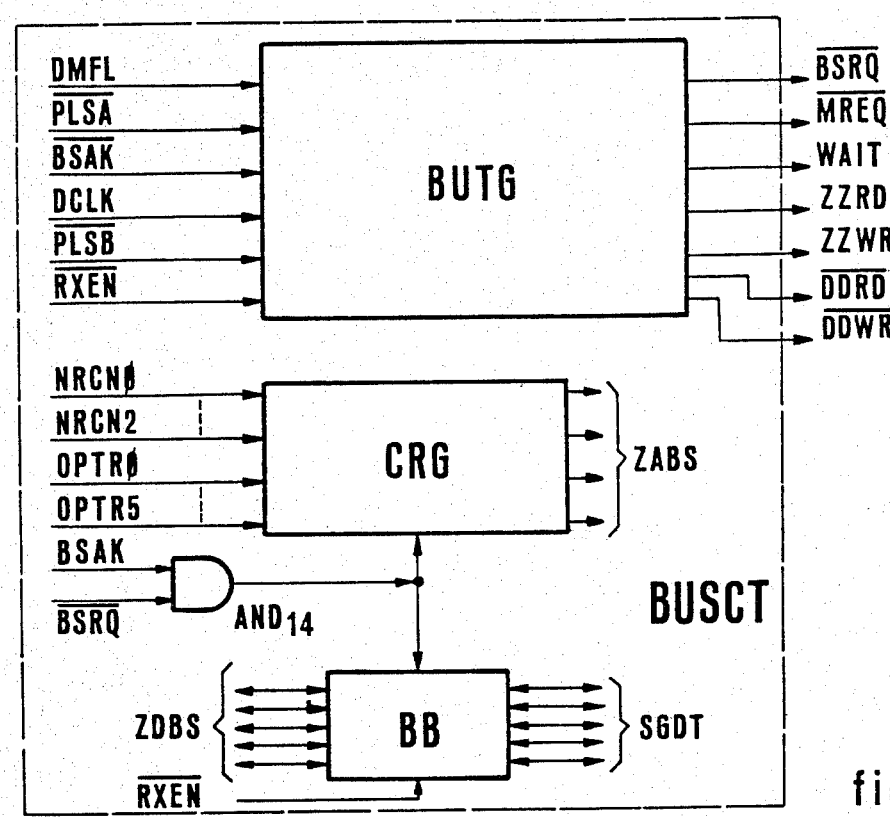
FIG. 14 is a block diagram of unit BUSCT shown in FIG. 10.

In FIG. 14 the block diagram of subunit BUSCT, already described as serving to carry out interface functions with microprocessor MPI, is illustrated; in particular, if subunit PRDLG informs subunit BUSCT through signal DMFL that it is necessary to run a DMA cycle, subunit BUSCT does so at the address obtained by combining the number of the bundle served at that moment with the indications of the memory position in which the cycle is to be run, as well as the read or write condition.

Figure 15:
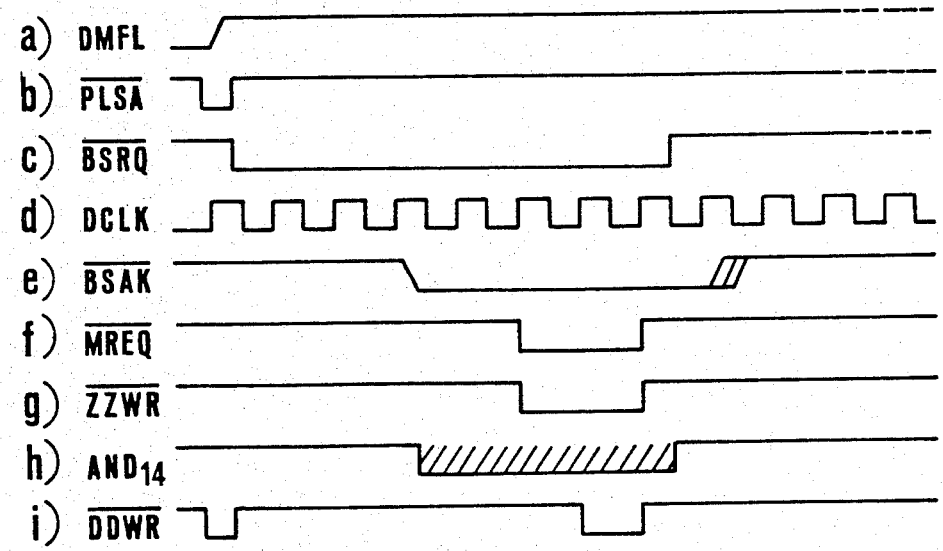
FIG. 15 shows waveforms relating to FIG. 14.

Subunit BUSCT includes a timer BUTG whose operation is illustrated along with the waveforms in FIG. 15 where:

graph a illustrates the course of the signal DMFL which indicates that a DMA cycle must be carried out;

graph b shows the signal $\overline{PLSA}$ generated by subunit DMATG as mentioned previously;

graph c shows the course of a signal $\overline{BSRQ}$ which expresses a request to the microprocessor for access to the buses;

graph d shows the course of the previously mentioned timing pulses DCLK;

graph e shows the course of a signal BSAK emitted by the microprocessor in response to the reception of signal $\overline{BSRQ}$ when it is ready to grant access to the buses;

graph f shows the course of a signal $\overline{MREQ}$ destined to be sent to the microprocessor when a write function is to be carried out in the memory thereof;

graph g shows the course of a signal ZZWR which expresses an instruction to write in the memory of the microprocessor;

graph h shows the course of the signal that corresponds to the output of a gate $AND_{14}$ of FIG. 14 receiving signals BSAK and $\overline{BSRQ}$;

graph i shows the course of a signal DDWR which expresses an instruction to write data in the memory of the microprocessor.

Subunit BUSCT also has a register complex CRG to the input of which the signals NRCN∅, ..., NRCN2 and OPTR∅, ..., OPTR5 are applied which express the address of the memory position in the microprocessor wherein the DMA cycle is to be performed; these addresses reach the microprocessor through the address bus ZABS. In the event of a DMA cycle being performed towards the microprocessor, the data present on bus SGDT pass through the bidirectional buffer BB and reach microprocessor MPI by means of the data bus ZDBS. Whenever, on the other hand, a DMA cycle is read out from processor MPI, the data reach the buffer BB by means of the bus ZDBS and are forwarded onto the bus SGDT. The bidirectional buffer BB is enabled by the signal appearing in the output of gate $AND_{14}$ and the transit direction is defined by the logical level of signal $\overline{RXEN}$.

Figure 16:
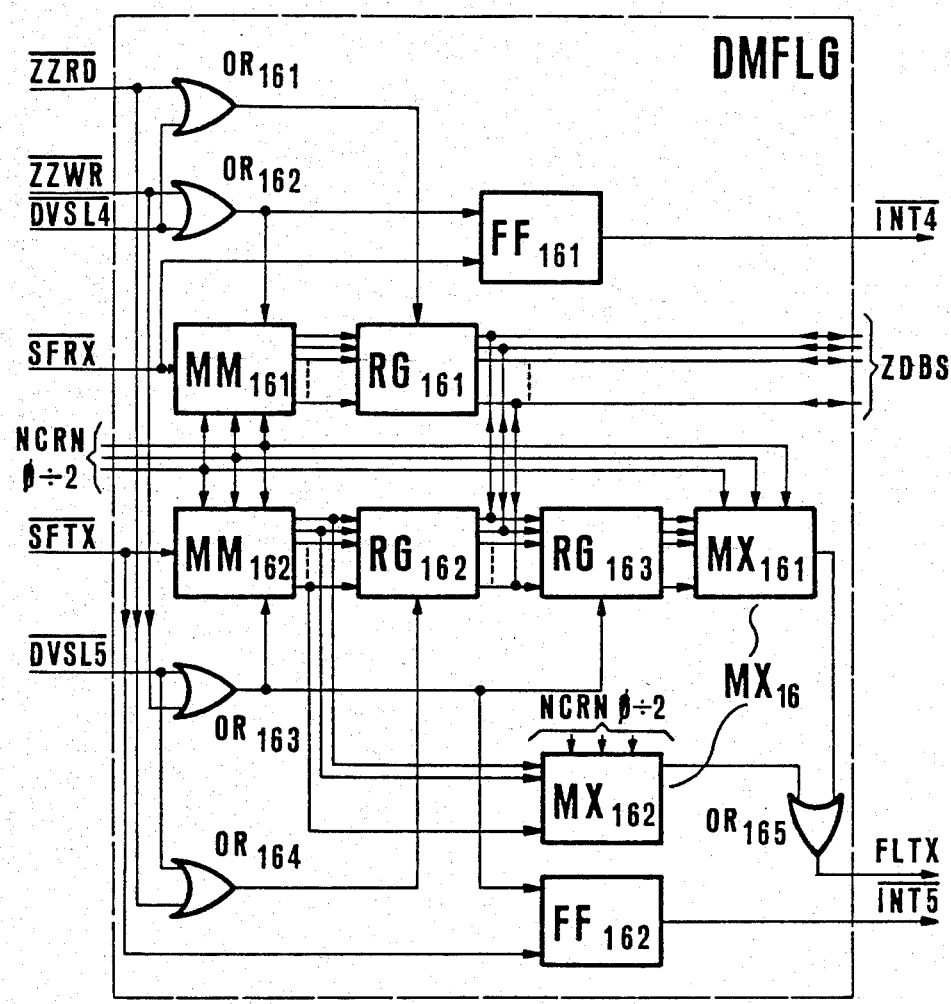
FIG. 16 is a block diagram of unit DMFLG shown in FIG. 10.

In FIG. 16 we have shown details of subunit DMFLG detecting the transmission and reception flags; in particular, if there is at least one flag in transmission or in reception, subunit DMFLG sends an interrupt request, INT4 or INT5, to the microprocessor MPI.

Therefore, subunit DMFLG has a first section for carrying out the reception-side functions, and a second section for carrying out the transmission-side functions.

With every reception cycle that is concluded by a DMA transfer of the last character of a signalization message, subunit PRDLG generates a pulse $\overline{SFRX}$ which is fed to a signal input of a memory $MM_{161}$ provided in the first section. Memory $MM_{161}$ comprises 8 memory cells, each of which is associated with a corresponding PCM system in reception; the pulse being fed to memory $MM_{161}$ is actually written in the memory cell identified by the binary configuration of signals NCRN∅, ..., NCRN2 indicating the channel number to which the DMA operation refers. The appearance of pulse $\overline{SFRX}$ also determines the switching of a flip-flop $FF_{161}$ generating the signal $\overline{INT4}$ which acts as an interrupt request for the processor MPI.

The contents of memory $MM_{161}$ may be read by the microprocessor by means of a register $RG_{161}$ which emits the contents of the memory to the data bus ZDBS when the output of an OR gate $OR_{161}$ is active, and into which the signal $\overline{ZZRD}$, emitted by the microprocessor when it intends to carry out a reading operation, is fed together with a signal DVSL4.

Furthermore, memory $MM_{161}$ may be cleared through an OR gate $OR_{162}$ into which the signal DVSL4 and a signal $\overline{ZZWR}$, emitted by the microprocessor when it intends to perform a write function, are fed; activation of the output of gate $OR_{162}$ resets the flip-flop $FF_{161}$ and terminates the reception-interrupt request $\overline{INT4}$. Similarly to the first section, the second section also has a memory $MM_{162}$ with a number of cells equal to the number of PCM channels; at the end of transmission cycles concluded with the transfer of the last character of a message, a signal $\overline{SFTX}$ is fed to memory $MM_{162}$ and stored in the cell identified by the binary configuration NCRN∅, ..., NCRN2, while at the same time the signal $\overline{SFTX}$ causes the setting of a flip-flop $FF_{162}$ emitting an interrupt request $\overline{INT5}$ to the microprocessor. The contents of memory $MM_{162}$ may be read by microprocessor MPI by means of a register $RG_{162}$ when the output of an OR gate $OR_{162}$, into which the signals $\overline{ZZRD}$ and DVSL5 are fed, is active. Register $RG_{162}$ forwards the contents of memory $MM_{162}$ to the microprocessor through the data bus ZDBS; excitation of the output of gate $OR_{164}$ resets the flip-flop $FF_{162}$ and consequently terminates the interrupt request $\overline{INT5}$.

The memory $MM_{162}$ is cleared when the output of an OR gate $OR_{163}$, into which the signals DVSL5 and $\overline{ZZWR}$ are fed, is active.

In order to inhibit the transmission of signalization messages on those channels where such transmission is not required, the second section of subunit DMFLG has a register $RG_{163}$, with a number of cells equal to the number of PCM channels, in which the microprocessor MPI can write a disabling mask through the bidirectional data bus ZDBS. To the output of register $RG_{163}$ the first section $MX_{161}$ of a multiplexer $MX_{16}$ is connected, and to the addressing input of multiplexer $MX_{16}$ the binary configuration NCRN∅, ..., NCRN2 is sent.

In order to inhibit transmission of signalization messages on those channels where such transmission has just been finished (before the microprocessor responds to request $\overline{INT5}$, multiplexer $MX_{16}$ has a second section $MX_{162}$ the data input of which is connected to the output of memory $MM_{162}$.

The outputs of multiplexer sections $MX_{161}$ and $MX_{162}$ are combined through an OR gate $OR_{165}$ whose output carries the signal FLTX which constitutes a transmission-inhibit request for those PCM channels where a logical value 1 is stored in the respective cells of register $RG_{163}$ or memory $MM_{162}$.

Figure 17:
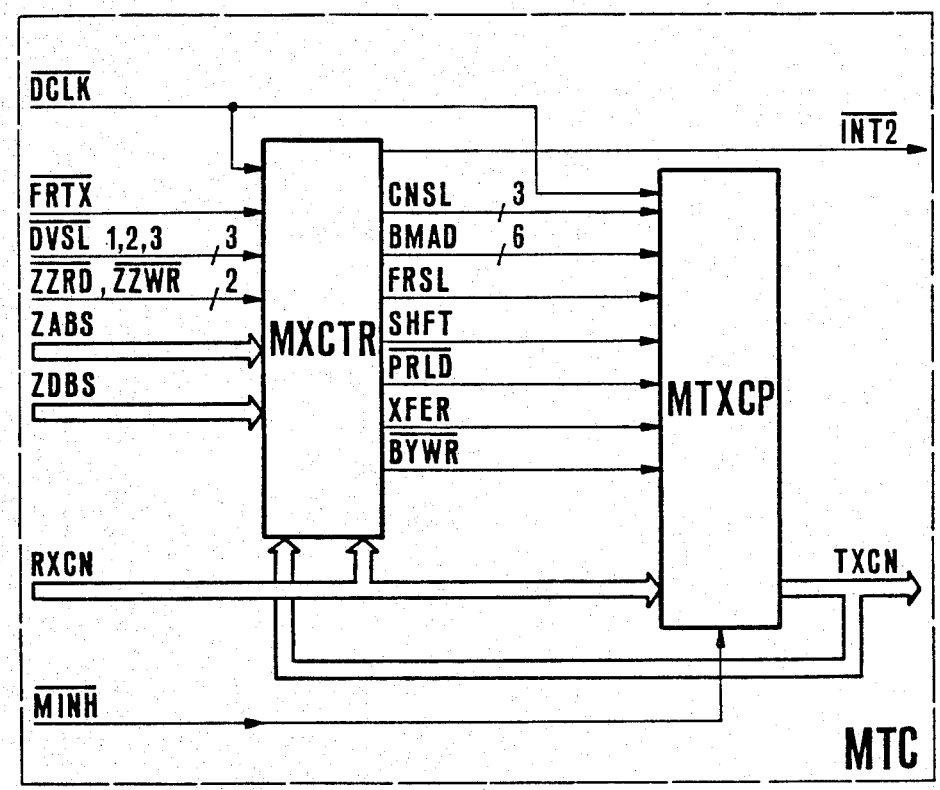
FIG. 17 is a block diagram of unit MTC shown in FIG. 2.

In FIG. 17 the block diagram of the switching matrix MTC is illustrated; this component is able to switch 256 input channels onto 256 output channels, the channels being organized into 8 time-division bundles with 32 channels in each bundle; the switching is hardware-controlled by an image memory written by microprocessor MPI, as already noted.

Matrix MTC has a test circuit that checks coincidence between input characters and output characters passing to and from the switching matrix, according to the image provided by the control memory; any anomalies are signaled to the microprocessor MPI through an interrupt request INT2.

The matrix MTC is composed of a first functional unit or subdivision MTXCP, for carrying out switching, which is controlled by a second functional unit or subdivision MXCTR.

The task of unit MXCTR is to generate, starting from signals $\overline{DCLK}$ and $\overline{FRTX}$, the timing necessary for the operation of unit MTXCP according to the switching scheme, or "image", set up in unit MXCTR by the microprocessor MPI, and for this purpose the signals CNSL, BMAD, FRSL, SHFT, $\overline{PRLD}$, XFER, $\overline{BYWR}$ are generated. Unit MXCTR also receives the signals RXCN and TXCN and, by examining the samples contained in them, tests the correct functioning of the switching matrix: in the event of an error, the interrupt request $\overline{INT2}$ is activated.

The signal $\overline{MINH}$ inhibits the switching matrix during time slots Nos. 0 and 16 in which unit SGC inserts the signalization information into the PCM frame.

The operation of unit MTXCP may be described as follows:

The eight incoming bundles RXCN have been synchronized by the line-interface unit ILN and all have a time slot No. 0 in alignment with time interval No. 1.

The samples present in homologous time slots of the eight frames received (RXCN) are simultaneously introduced into as many receiving shift registers and are successively delivered to the switching memory. To carry out this series/parallel conversion, unit MTXCP uses the signals $\overline{DCLK}$, CNSL, XFER.

For each sample presented by the series/parallel converter, unit MXCTR emits, as the switching-memory write address, the row address BMAD or number of the destination time slot and the column address FRSL or number of the destination bundle.

Since in each bit time the unit MTXCP must carry out a reading function and a writing function, the first half of each bit time is dedicated to the write operation and the strobe signal $\overline{BYWR}$ writes the available data at the destination identified by the addresses BMAD and FRSL.

The second half of each bit time is dedicated to memory reading and, as a row address, the number of the next time slot to be transmitted is provided; the memory will read out the eight samples stored there in a previous cycle. The strobe signal $\overline{PRLD}$, present only at the beginning of the time-slot interval, memorizes the eight samples in as many parallel/series converters; the signal SHFT provides the parallel/series converters with the necessary shift timing.

Figure 18:
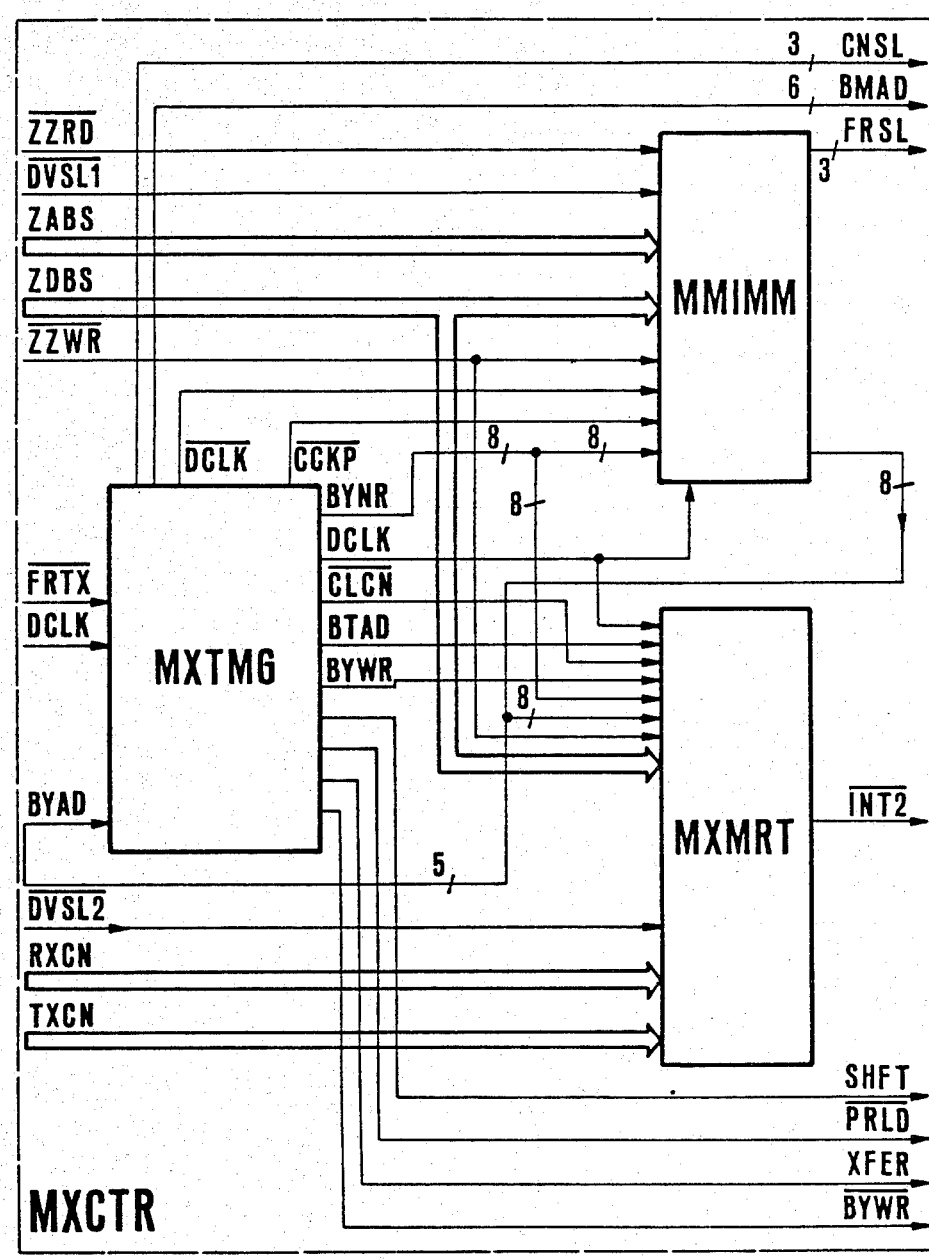
FIG. 18 is a block diagram of unit MXCRT shown in FIG. 17.

In FIG. 18 the block diagram of subdivision MXCTR of switching unit MTC is illustrated; this unit consists of three subunits:
timing generator MXTMG,
switching image memory MMIMM,
matrix-testing circuit MXMRT.

Circuit MXTMG receives the equipment-timing pulses DCLK and $\overline{FRTX}$ and generates the chip-timing pulses DCLK, $\overline{DCLK}$, CCKP, $\overline{CLCN}$, BTAD, BYNR.

BTAD indicates the current bit number (0, ..., 256), BYNR indicates the PCM-sample identity (channel number and the number of the time slot from which it has come) emitted at that moment from the series/parallel converter of matrix unit MTXCP.

By means of the data bus ZDBS and the address bus ZABS, the microprocessor MPI writes and updates, in memory MMIMM, the "map" of the connections to be established. This map is read cyclically with the address BYNR (received-sample identity) and in response provides the address BYAD of the same sample's destination according to that map. The three most-significant bits of address BYAD constitute the signal FRSL (number of the bundle of destination). The five least-significant bits, which indicate the number of the time slot within the frame, are supplied to the input of subunit MXTMG which uses it as the row writing address of matrix unit MTXCP.

The read and write row addresses of the matrix are sent to unit MTXCP at alternate intervals of $\frac{1}{2}$-bit duration; the signal BMAD consists of this combination of addresses.

Unit MXMRT is a testing circuit which, when set by the microprocessor MPI to the address of one of the 256 channels RXCN:
memorizes the destination address of the PCM samples of the chosen channel (from information BYNR and BYAD);
loads the entering PCM sample and the corresponding outgoing PCM sample into the memory;
compares the samples and, if this comparison indicates a difference, activates the alarm interrupt signal $\overline{INT2}$.

Figure 19:
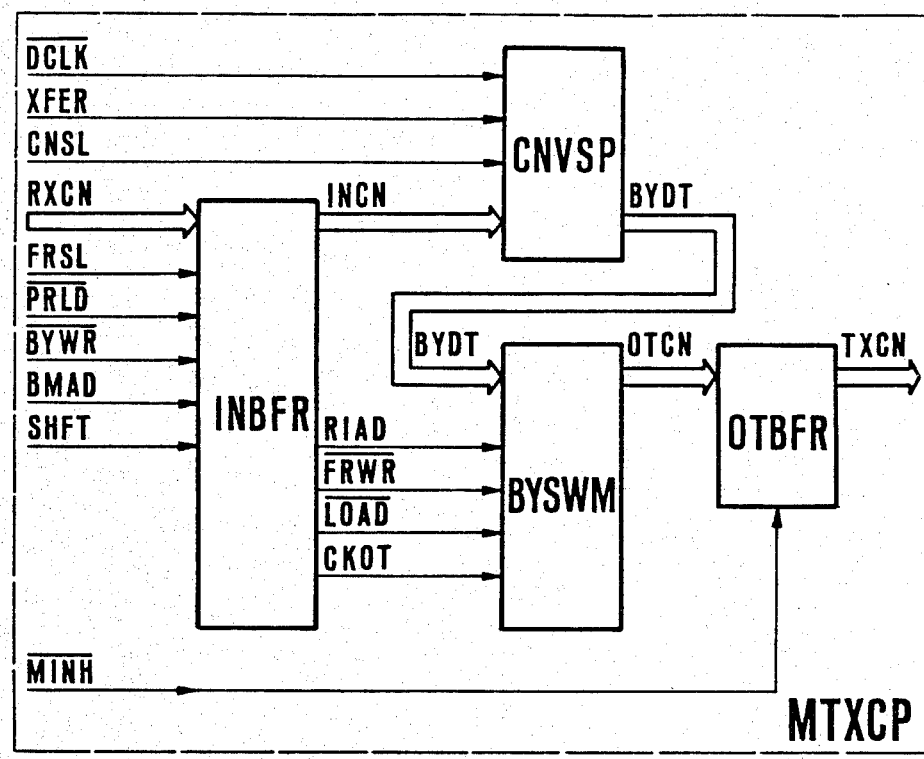
FIG. 19 is a block diagram of unit MTXCP shown in FIG. 17.

The matrix unit MTXCP illustrated schematically in FIG. 19 performs the switching of the 256 input slots (32 slots per frame) onto the 256 output slots. The switching clocks XFER, CNSL, FRSL, $\overline{PRLD}$, $\overline{BYWR}$, BMAD, SHFT are provided by module MXCTR; the inhibit signal $\overline{MINH}$ comes from module SGC.

The input signals RXCN and the timing signals FRSL, $\overline{PRLD}$, $\overline{BYWR}$, BMAD, SHFT are sent to the input buffer INBFR which performs interim storage and distribution thereof as row address signals (RIAD), column write signals ($\overline{FRWR}$), input signals (INCN), output timing ($\overline{LOAD}$, CKOT).

The signals INCN are sent to the series/parallel converter CNVSP which, by using the timing signals $\overline{DCLK}$, XFER, CNSL, receives at the same time the 8 PCM samples present in the $i^{th}$ time slot of signals INCN and sequentially presents them in parallel form during the eight bit intervals of the $(i+1)^{th}$ time slot as a signal BYDT.

Each sample BYDT is written at its destination in a matrix BYSWM by using the addresses RIAD and the write pulses $\overline{FRWR}$. At the beginning of each time slot the pulse $\overline{LOAD}$ charges the eight samples ready to be transmitted into the output serializer of matrix BYSWM and the serializer sequentially supplies them as output signals OTCN.

The signals OTCN are made available by a circuit OTBFR, through eight output buffers, as signals TXCN.

The output buffers are regularly inhibited during time slots No. 0 and No. 16 of signal $\overline{\text{MINH}}$.

Figure 20:
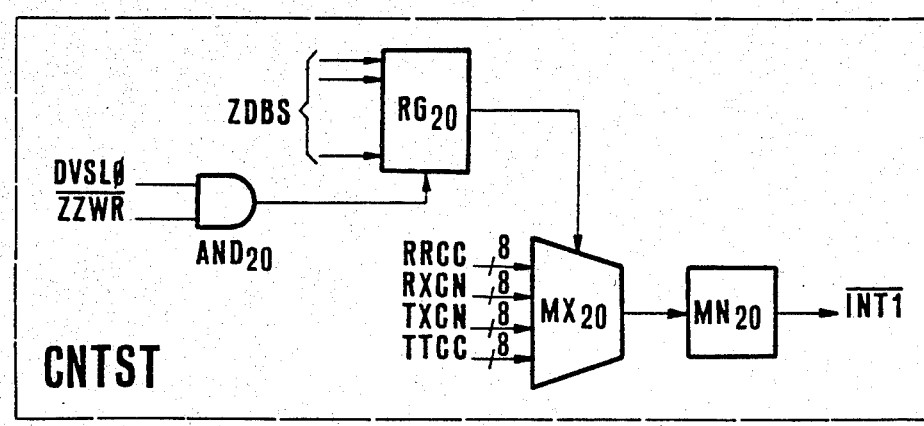
FIG. 20 is a block diagram of unit CNTST shown in FIG. 3.

In FIG. 20, the monitoring or control circuit CNTST of FIG. 3 is illustrated in detail; this circuit has a multiplexer $MX_{20}$ with four groups of eight inputs which are reached by signals RRCC, RXCN, TXCN and TTCC.

Multiplexer $MX_{20}$ receives on its control input the signals present on the outputs of a register $RG_{20}$ in which the microprocessor MPI, by means of the data bus ZDBS, writes the address of the PCM system to be controlled; updating of the contents of register $RG_{20}$ may be performed only in the No. 0 time slot of each PCM frame (this time slot not being engaged by signalization) in the presence of signal $DVSL\emptyset$ and write command ZZWR delivered to an AND gate $AND_{20}$.

The output of multiplexer $MX_{20}$ is connected to the input of a monostable circuit or monoflop $MN_{20}$ with a release period greater than the time interval that elapses between two consecutive transitions of the PCM signals.

If a fault occurs on the circuits pertaining to a generic channel, the absence of transitions on the signal being checked is registered upon the resetting of monoflop $MN_{20}$; this occurrence is signaled to microprocessor MPI by means of an interrupt request INT1.

Figure 21:
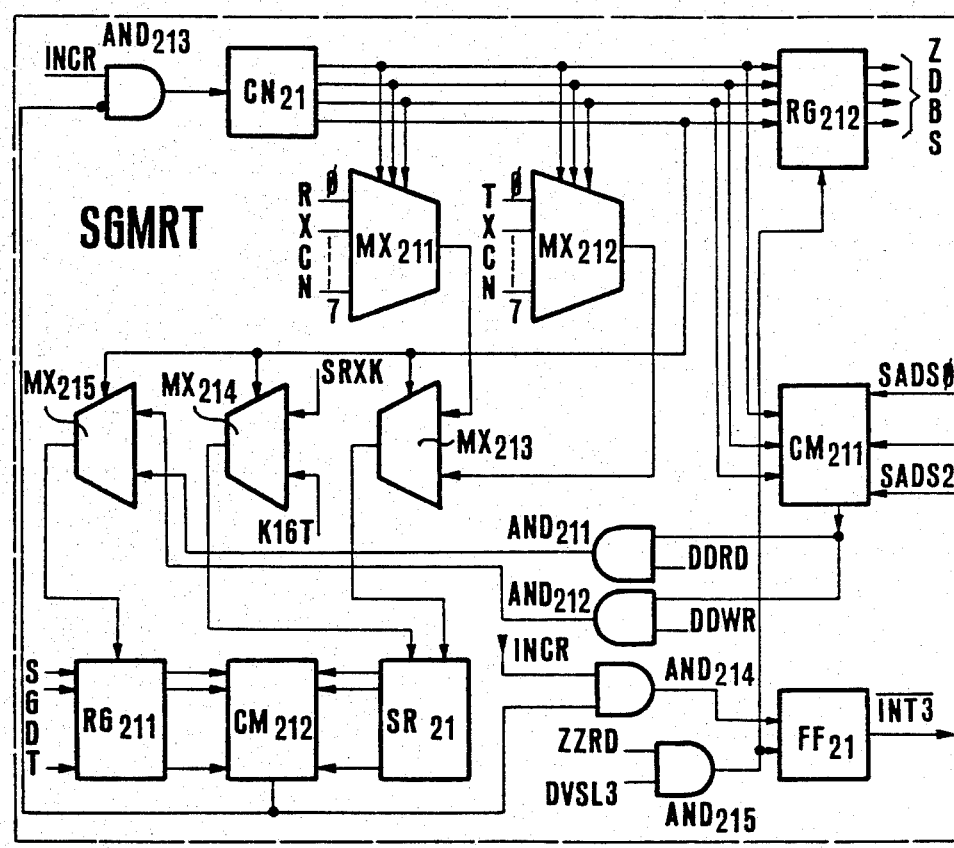
FIG. 21 is a block diagram of unit SGMRT shown in FIG. 6.

In FIG. 21 the circuit SGMRT of FIG. 6 is illustrated in detail; this circuit comprises a four-stage counter $CN_{21}$ which is made to advance by the coincidence of active incremental pulses INCR from timing circuit SGTMG with temporal channel No. 16 of each frame.

The three least-significant outputs of counter $CN_{21}$ address two multiplexers $MX_{211}$ and $MX_{212}$ to the inputs of which, respectively, the first bus RXCN and the second bus TXCN are connected. The fourth output of counter $CN_{21}$ drives further multiplexers $MX_{213}$, $MX_{214}$ and $MX_{215}$ to whose inputs are respectively supplied the output signals of multiplexers $MX_{211}$ and $MX_{212}$, the timing pulses SRXK and K16T for incoming and outgoing signalization, as well as two strobe signals DDRD and DDWR emitted by the microprocessor MPI.

The bits present on the three most-significant outputs of the counter $CN_{21}$ are also fed to a comparator $CM_{211}$ which compares them with a binary configuration $SADS\emptyset$, . . . , SADS2, sent by subunit DMATG and giving the number of the PCM channel to be checked.

When the comparator $CM_{211}$ detects a coincidence between the signals present on its inputs, it enables a pair of AND gates $AND_{211}$, $AND_{212}$ to whose second inputs the strobe signals DDRD and DDWR are applied and the outputs of which are connected to the inputs of multiplexer $MX_{215}$.

The PCM signals that correspond to the output of multiplexer $MX_{213}$ are fed to a shift register $SR_{21}$ which memorizes them with the recurrence frequency defined by stepping pulses present at the output of multiplexer $MX_{214}$.

The contents of register $SR_{21}$ are supplied to a comparator $CM_{212}$ which receives the signals present on a register $RG_{211}$ at its second input.

The sixth bus SGDT is connected to the input of register $RG_{211}$ and memorizes the signals present there when it receives the strobe signal available at the output of multiplexer $MX_{215}$. If the comparison fails, the output signal of comparator $CM_{212}$ blocks an AND gate $AND_{213}$, stopping advancement of the counter, and unblocks an AND gate $AND_{214}$; the next pulse INCR sets a flip-flop $FF_{21}$ which sends an interrupt request INT3 to the microprocessor MPI.

In response to reception of signal INT3, the microprocessor emits signals ZZRD and DVSL3 which are fed to an AND gate $AND_{215}$. The signal corresponding to the output of the gate $AND_{215}$ resets the flip-flop $FF_{21}$ and authorizes the sending of the binary configuration, memorized in the register $RG_{212}$ that is connected to the output of counter $CN_{21}$, onto the data bus ZDBS, thus allowing the processor MPI to receive the number of the channel in which a failure has occurred.

Figure 22:
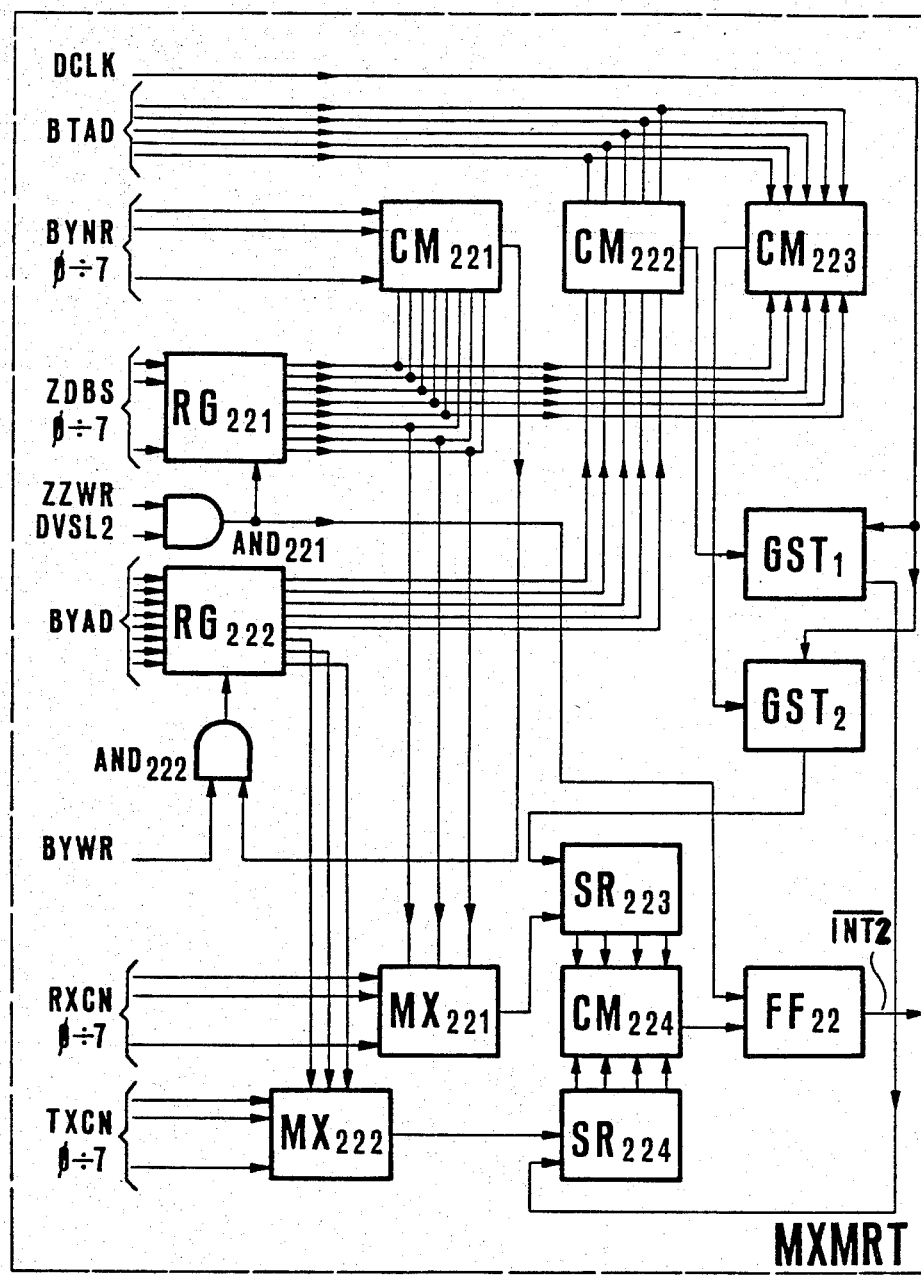
FIG. 22 is a block diagram of unit MXMRT shown in FIG. 18.

In FIG. 22 the control circuit MXMRT of FIG. 18 is illustrated in a block diagram; the microprocessor MPI sends, by means of the data bus ZDBS, the address of the temporal channel under test to this circuit. That address is memorized in the register $RG_{221}$ when the output of a gate $AND_{221}$, into which signals ZZWR and DVSL2 also emitted by the microprocessor are fed, is active.

The binary configuration present in the output of register $RG_{221}$ reaches the first input of a comparator $CM_{221}$ which receives on its second input the binary configuration BYNR emitted by matrix timer MXTMG, representing the number of the temporal channel which is supplied to the matrix MTC at the instant considered. When comparator $CM_{221}$ detects the identity of the data received, it emits a pulse that is fed to an AND gate $AND_{222}$ which receives on its second input a signal BYWR emitted by timer MXTMG.

Excitation of the output of gate $AND_{222}$ enables a register $RG_{222}$ to store the binary configuration BYAD, present at its input, which is available on the output of image memory MMIMM and expresses the destination address of the PCM samples present in the considered temporal channel.

The signals present at the five least-significant outputs of register $RG_{222}$ are fed to a comparator $CM_{222}$ which receives the binary configuration BTAD on its second input; this configuration expresses the reading address of the switching matrix BYSWM. When comparator $CM_{222}$ detects a coincidence between these data, it emits a pulse which activates a timing-signal generator $GST_1$ designed to emit eight pulses of a frequency equal to that of signal DCLK.

The same binary configuration BTAD, emitted by timer MXTMG, is also fed to another comparator $CM_{223}$ which receives on its second input the signals available on the five least-significant outputs of register $RG_{221}$. When comparator $CM_{223}$ detects a coincidence between the data so received, it emits a pulse that activates a second timing-signal generator $GST_2$ which is also designed to emit eight pulses of a frequency equal to that of signal DCLK.

The extraction of the received PCM codes is performed through a multiplexer $MX_{221}$ to the data input of which the bus RXCN is connected and the address input of which is connected to the three most-significant outputs of register $RG_{221}$. On the other hand, the extraction of the PCM codes emitted by switching matrix BYSWM is performed through a second multiplexer $MX_{222}$ to the data input of which the bus TXCN is connected and the address input of which is connected to the three most-significant outputs of register $RG_{222}$.

The PCM signals corresponding to the output of multiplexer $MX_{221}$ are fed to a shift register $SR_{223}$ which memorizes the contents of the temporal channel that coincides with the reception of the timing pulses emitted by generator $GST_2$.

The PCM signals corresponding to the output of multiplexer $MX_{222}$, on the other hand, are fed to a shift register $SR_{224}$ which memorizes the contents of the temporal channel that coincides with the reception of the timing pulses emitted by the generator $GST_1$.

The contents of registers $SR_{223}$ and $SR_{224}$ reach the respective inputs of a further comparator $CM_{224}$, designed to emit a pulse when it picks up the absence of coincidence between the data received by it.

A pulse emitted by comparator $CM_{224}$ sets a flip-flop $FF_{22}$ that sends an operating-program-interrupt request $\overline{INT2}$ to the microprocessor MPI. The latter then picks up the presence of the interrupt request and emits signals ZZWR and DVSL2 that, through gate $AND_{221}$, reset the flip-flop $FF_{22}$.

Figure 23:
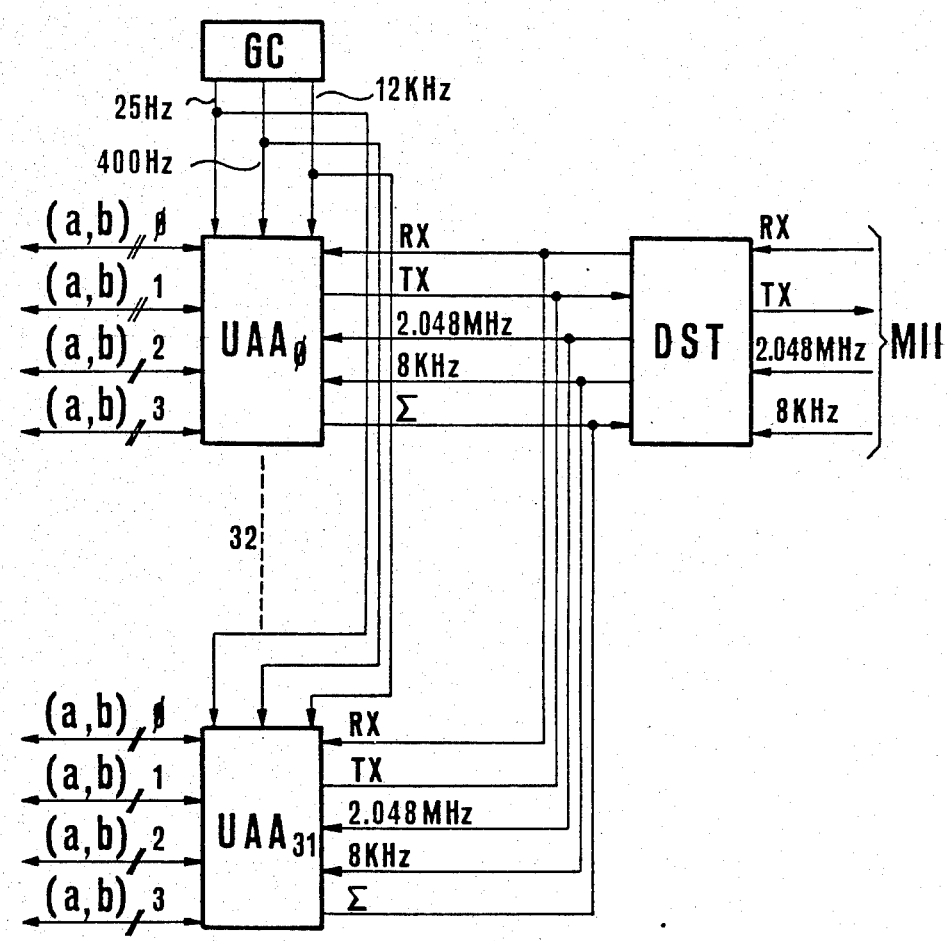
FIG. 23 shows a group of units UAA indicated in FIG. 1.

FIG. 23 shows units $UAA_0 \ldots UAA_{31}$ connected to one of the x PCM bundles represented in FIG. 1.

This PCM bundle includes connections TX which carry the PCM codes entering the automatic switching assembly AC, connections RX which carry the PCM codes leaving the assembly AC, as well as connections conveying the 2.048-MHz and 8-KHz timing pulses emitted by unit CKC.

The connections described above are joined to a unit DST designed to perform conversion from balanced signals to CMOS and vice-versa. A signal $\Sigma$ also fed to unit DST is active when at least one of the units UAA connected to it is involved in a transmission and enables the converter of the signals destined to be emitted onto connection TX.

The 32 access units $UAA_0, \ldots, UAA_{31}$ are connected to the output of unit DST and are each capable of serving up to four subscribers via wires $(a,b)0, \ldots, (a,b)3$.

Each unit UAA receives the 25-Hz ringing signal, a 400-Hz tone serving as an audio-frequency carrier to be modulated for subscriber signalization, and a 12-KHz signal for billing, from a centralized oscillation generator GC.

Figure 24:
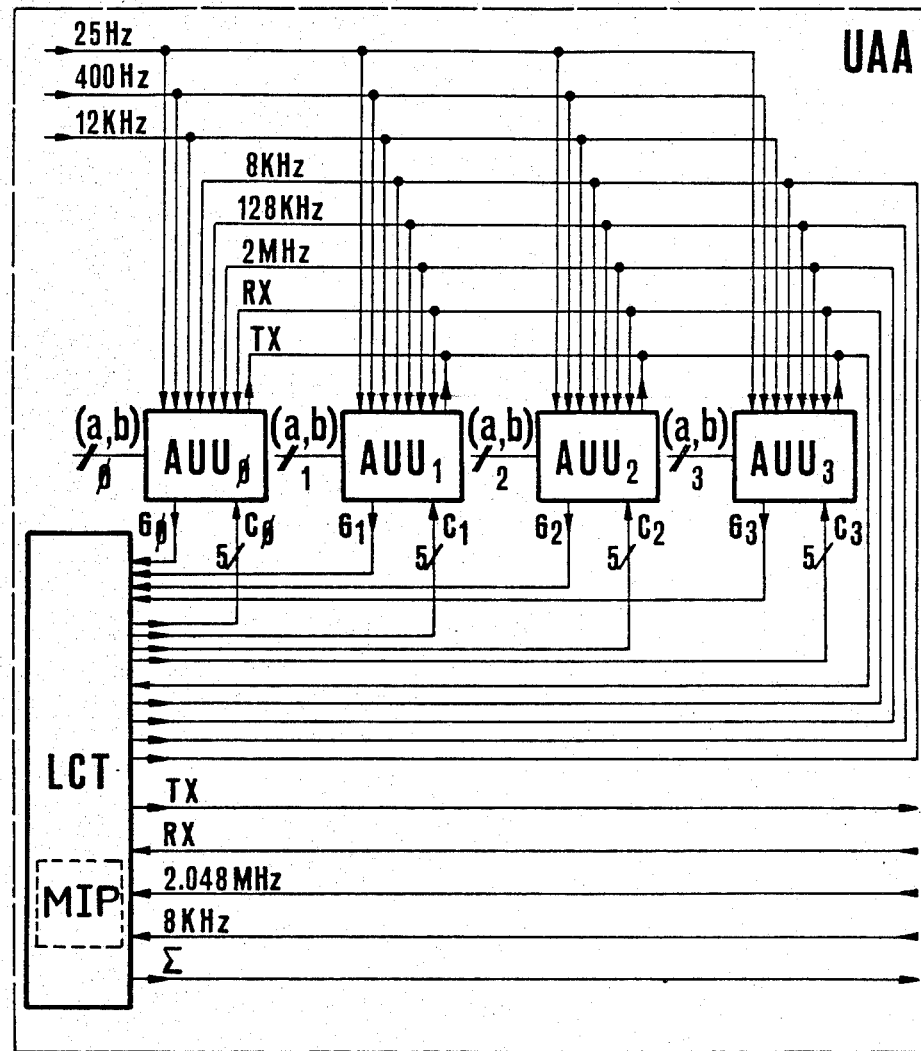
FIG. 24 is a block diagram of one of the units UAA shown in FIG. 23.

In FIG. 24 the block diagram of a generic unit UAA is illustrated. This unit comprises four subscriber junctions $AUU_0, \ldots, AUU_3$ to each of which a respective subscriber line (a, b) is connected as well as the outputs of oscillator GC.

Junctions $AUU_0, \ldots, AUU_3$ receive respective commands $C_0, \ldots, C_3$ which will be more fully described further on, from a logical control unit LCT and signal to that unit, at $G_0, \ldots, G_3$, the status of the hook switches of the subscriber's subsets respectively connected to them. Unit LCT communicates with unit DST by means of the connections mentioned previously.

Figure 25:
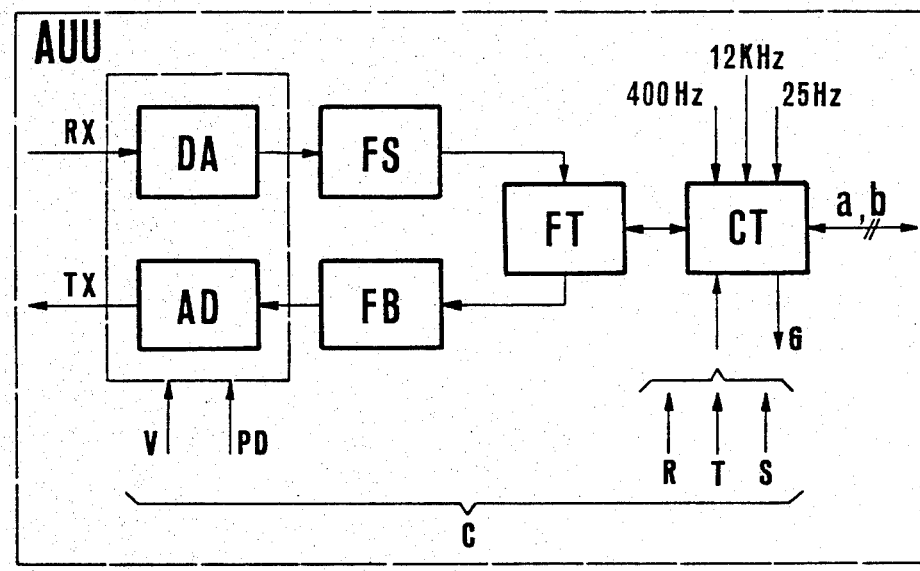
FIG. 25 is a block diagram of a unit AUU shown in FIG. 24.

In FIG. 25 there is shown a block diagram of a generic subscriber junction AUU comprising the following functional units:

a digital-to-analog converter DA which receives a PCM signal and converts it into a phonic signal;

a low-pass filter FS that limits the band of the signal leaving the converter DA;

an analog-to-digital converter AD that transforms a phonic signal into a digital signal;

a low-pass filter FB that limits the band of the phonic signal;

a hybrid coil FT;

telephone circuits CT into which the signals emitted by generator GC as well as the commands C emitted by unit LCT are fed, and which emit the signal G representing the position of the hook switch; the loop (a, b) is connected to these telephone circuits.

The commands C emitted by unit LCT encompass the following signals:

a signal R to authorize the sending to the subscriber of the call signal;

a signal T to authorize the emission of the billing pulses;

a signal S to authorize the emission of the telephone criteria (free, busy, etc.).

The DA-AD complex, on the other hand, receives from unit LCT an enabling signal PD as well as a signal V present in the time interval that coincides with the temporal channel assigned to the subscriber subset considered.

Unit LCT shown in FIG. 24 essentially comprises an internal microprocessor MIP, of commercially available type, as well as a control unit UCT which is described in detail with reference to FIG. 26.

The internal microprocessor performs the following functions:

it interprets the line-signalization criteria, starting from the hook signal G picked up at the output of junction AUU;

it transforms line signalization into messages that the unit UCT will allocate in the 16th time slot of the PCM channels;

it transfers these messages in parallel to unit UCT by means of a bidirectional bus ADD together with two strobe signals AS and DS when it receives the signals INTTX and INTTOUT from unit UCT;

it receives from unit UCT, together with a signal INTRX and by means of bus ADD, the signalization messages extracted from temporal channel No. 16, interprets them and executes them on line (commands C);

when a called subscriber replies, it commands analog-to-digital conversion of the phonic signal informing unit UCT of the number of the temporal channel assigned to the conversation by module MII.

Figure 26:
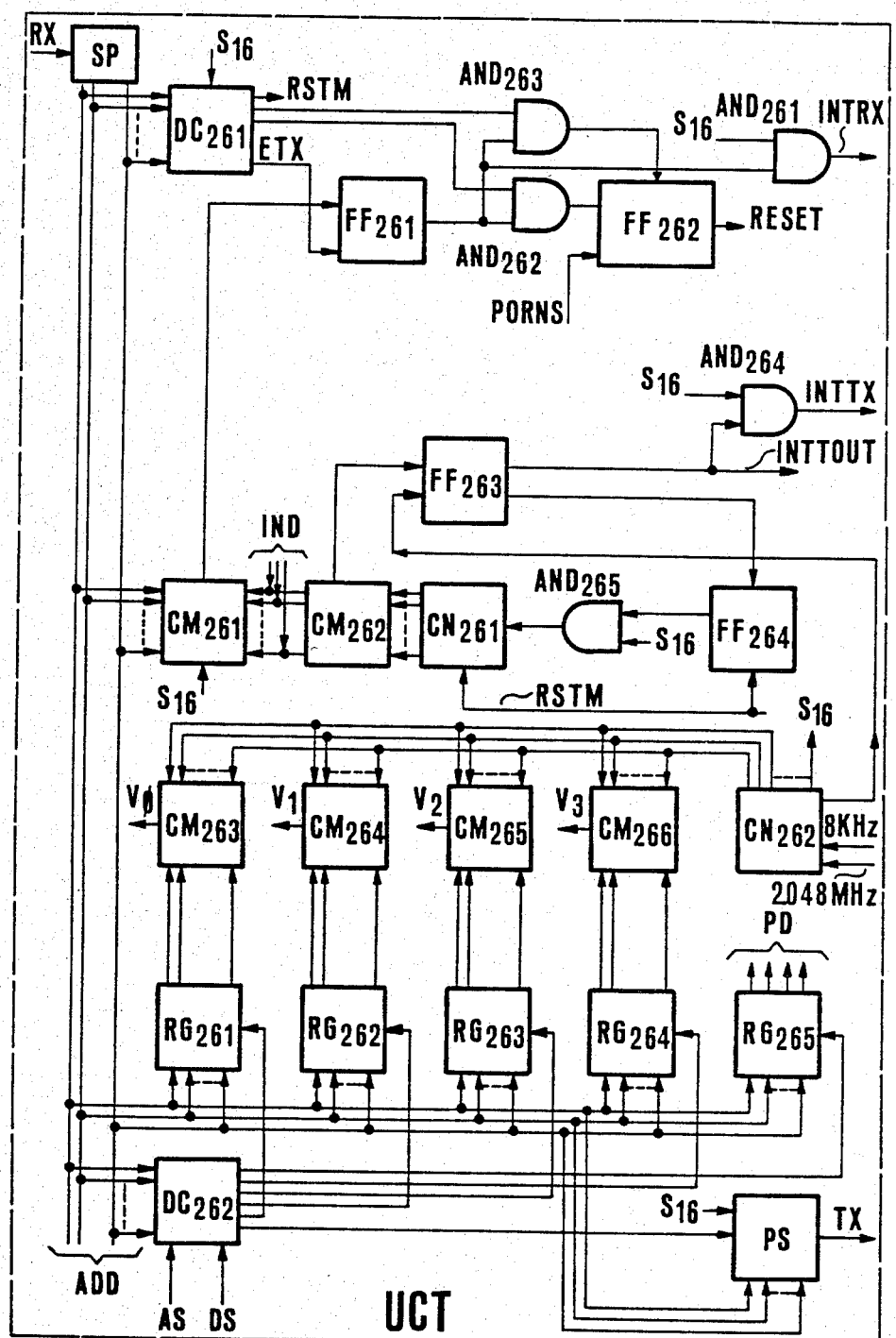
FIG. 26 is a block diagram of a unit UCT belonging to unit LCT shown in FIG. 24.

In FIG. 26 we have shown the block diagram of control unit UCT which carries out the following functions:

reception and series-parallel conversion of the message bytes inserted by module MII into the 16th temporal channel of each PCM system;

acknowledgment of only the messages addressed to the unit UAA to which they belong;

parallel-series conversion and transmission onto temporal channel No. 16 of the message bytes addressed to module MII;

enablement and disablement of converters AD, DA of the four junctions AUU and timing thereof;

recognition of control bytes sent by module MII and generation of signals to reset the internal microprocessor MIP.

For this purpose the unit UCT includes a series-parallel converter SP to the series input of which the RX line is input and to the parallel outputs of which the bus ADD is connected and through which unit UCT dialogues with the internal microprocessor MIP.

A comparator $CM_{261}$ connected to bus ADD compares the contents of temporal channel No. 16, sent onto bus ADD by the module MII, with a binary configuration realized by means of wiring which constitutes the calling code IND of unit UAA.

When module MII has to send a message to a subscriber belonging to such a unit UAA, it emits the calling code of this unit UAA as the starting byte of the text and ends the message with an end-of-text byte ETX that is the same for all units UAA.

Activation of the output of comparator $CM_{261}$ sets a flip-flop $FF_{261}$ which in its turn enables the transmission, through a gate $AND_{261}$, of a signal $S_{16}$ created in the presence of temporal channel No. 16 of each frame.

In this way, a pulse appearing in the output of gate $AND_{261}$ constitutes an interrupt request INTRX for the internal microprocessor which will extract the signalization byte from bus ADD.

Flip-flop $FF_{261}$ is reset by module MII which emits an end-of-text byte ETX recognized by a decoding unit $DC_{261}$.

Control unit UCT has the task of emitting a RESET signal for the microprocessor MIP and for this purpose includes a flip-flop $FF_{262}$ which is set by a pulse in the output of an AND gate $AND_{262}$, the latter being enabled by the output of flip-flop $FF_{261}$ to pass a pulse generated by decoder $DC_{261}$ in response to the recognition of a control byte sent from module MII.

Flip-flop $FF_{262}$ can be reset by module MII by means of a further control byte, recognized by decoder $DC_{261}$, which transits through a further gate $AND_{263}$ unblocked by the output of flip-flop $FF_{261}$. Flip-flop $FF_{262}$ can also be reset by a signal PORNS which is active as soon as the power supply of junction AUU is activated.

In order to transfer signalization messages directed toward module MII, unit UCT also includes a parallel-series converter PS that is connected to the bus ADD and is enabled by a signal emitted by a further decoding unit $DC_{262}$ responding to signals AS and DS emitted by the internal microprocessor MIP. Serial readout of converter PS is timed by the centralized clock exclusively in the presence of signal $S_{16}$. The signalization byte is thereupon emitted in series onto the wire TX.

It must be borne in mind that the internal microprocessor MIP sends the first byte of a signalization message for module MII to unit UCT in response to an interrupt request INTTOUT identifying the temporal window into which the unit UAA is authorized to emit its own signalization messages. In fact, a single PCM channel serves up to 64 units UAA which have at their disposal only one signalization slot per frame.

The signal INTTOUT is generated by means comprising a comparator $CM_{262}$ that compares the wired calling code IND with the most-significant outputs (from the 3rd on) of a counter $CN_{261}$ which is advanced by the signal $S_{16}$ via an AND gate $AND_{265}$ and is reset by module MII through a control byte RSTM recognized by $DC_{261}$.

The presence of a pulse in the output of comparator $CM_{262}$ sets a D-type flip-flop $FF_{263}$ generating the interrupt request INTTOUT which unblocks an AND gate $AND_{264}$ whose second input receives the signal $S_{16}$ and which generates the interrupt request INTTX.

Since messages destined to be sent to the module MII have a fixed length of 8 bytes, flip-flop $FF_{263}$ is reset after eight frames, counted from the appearance of signal INTTOUT, by the disappearance of the pulse on the output of the comparator $CM_{262}$.

Therefore, the internal microprocessor MIP receives the interrupt request INTTX eight times, responding to it by emitting each time one of the eight bytes of the message.

The resetting of flip-flop $FF_{263}$ sets a flip-flop $FF_{264}$ that inhibits the transmission of stepping pulses $S_{16}$ through gate $AND_{265}$. Module MII resets the flip-flop $FF_{264}$ with the control byte RSTM, present every 256 msecs.

For the enablement of units AUU, control unit UTC includes a group of registers $RG_{261}, \ldots, RG_{264}$ which are activated separately by the internal microprocessor MIP through the decoder $DC_{262}$ and are connected to bus ADD. Microprocessor MIP writes a binary configuration in each of these registers which indicates the temporal channel assigned by module MII to each of the subscribers served by unit UCT and involved in a telephone conversation.

The output signals of registers $RG_{261}, \ldots, RG_{264}$ are compared by as many comparators $CM_{263}, \ldots, CM_{266}$ with the output of a counter $CN_{262}$ advanced by the centralized clock at 2.048 Mbits/s, timed by the 8-KHz signal, at the output of which the signal $S_{16}$ is also available.

The signals $V_0, \ldots, V_3$, present on the outputs of the corresponding comparators $CM_{263}, \ldots, CM_{266}$, activates the respective converter complexes AD-DA. The appearance of at least one of the V signals provokes the emission, by an OR circuit that is not illustrated, of the sum signal $\Sigma$.

Another register $RG_{265}$ is also connected to the bus ADD; this register is addressed by the internal microprocessor MIP through a control byte recognized by decoder $DC_{262}$ and is loaded by the microprocessor MIP with an enabling mask (signals PD) for units AUU.

In particular, the PD signal enables the operation of the respective unit AUU whereas the V signal defines the temporal interval of the PCM system assigned to each unit AUU.

Figure 27:
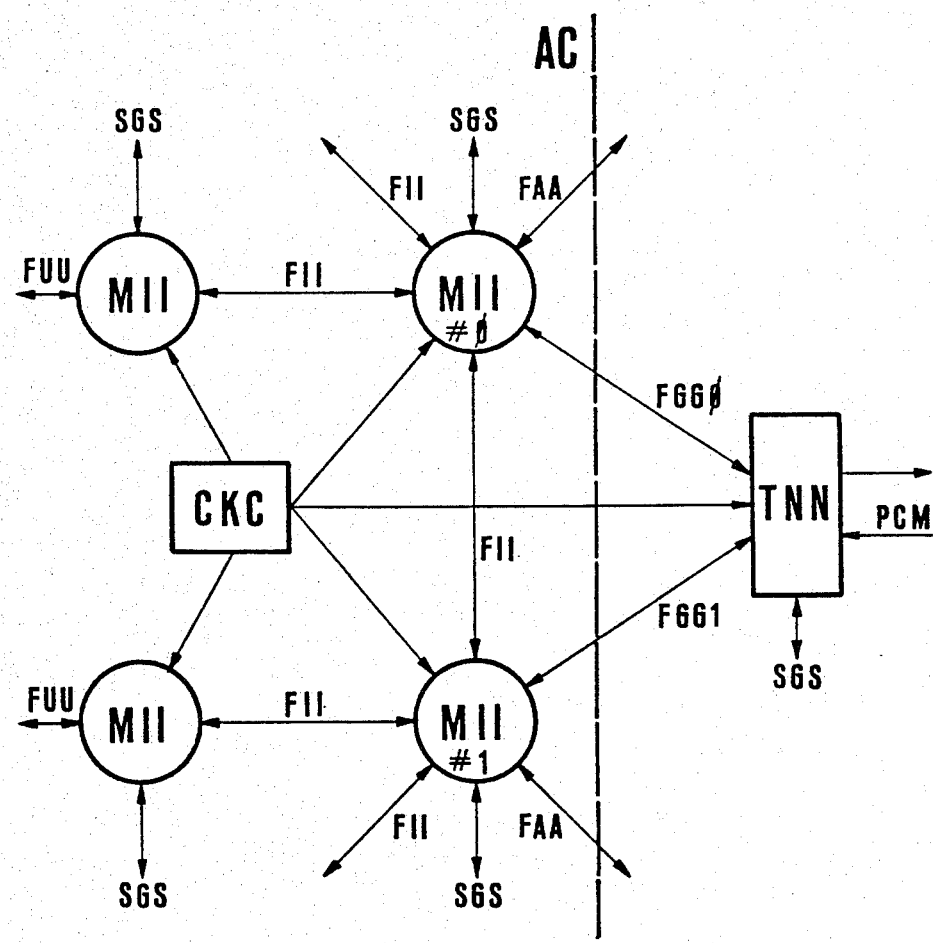
FIG. 27 shows an access unit relating to digital lines TNN shown in FIG. 1.

In FIG. 27 the connection of a digital line terminal TNN to the switching assembly AC is illustrated.

We wish to point out that in FIG. 1, for pure simplification, each terminal TNN has been shown connected to only one module MII. However, according to a preferred form of realization, the 30 channels of the PCM bundle connected to each terminal TNN are shared between two modules MII, for reliability reasons; if a total inoperativeness of a module MII should occur, the PCM bundle connected to such a terminal TNN would then not be completely out of service.

In FIG. 27 we have shown at MII#∅ and MII#1 the two modules linked with terminal TNN whose connections with timing-pulse generator CKC have been made evident, as also its connection to the managing and supervising unit SGS; again, for reasons of simplification, these connections are not represented in FIG. 1. Component TNN constitutes the termination of a 2.048-Mbits/s PCM trunk that connects the exchange to another exchange with 30 phonic channels and PCM-type signalization on two paths per direction.

The 30 phonic channels on the "network side" are divided into two groups (for example 1, ..., 15 and 17, ..., 31) which are respectively connected to bundles FGG∅ and FGG1 extending to modules MII#∅ and MII#1 on the "exchange side". Terminal TNN has the task of receiving and interpreting the network-side signalization and generating the exchange-side signalization messages which will be sent to bundle FGG∅, if they concern events on the channels of the first group, or to bundle FGG1, if they concern events on the channels of the second group. Conversely, terminal TNN also performs the receiving and interpreting of exchange-side signalization messages and the translation thereof into the corresponding network-side signalization.

Terminal TNN is connected to supervisory unit SGS through a serial data line for diagnostic and management functions (activation, deactivation of channels, etc.).

Still in FIG. 27, a PCM bundle connecting a module MII to an analog-type trunk interface UGG is indicated at FUU, and a PCM bundle that connects a module MII to a subscriber-line interface UAA is indicated at FAA.

Figure 28:
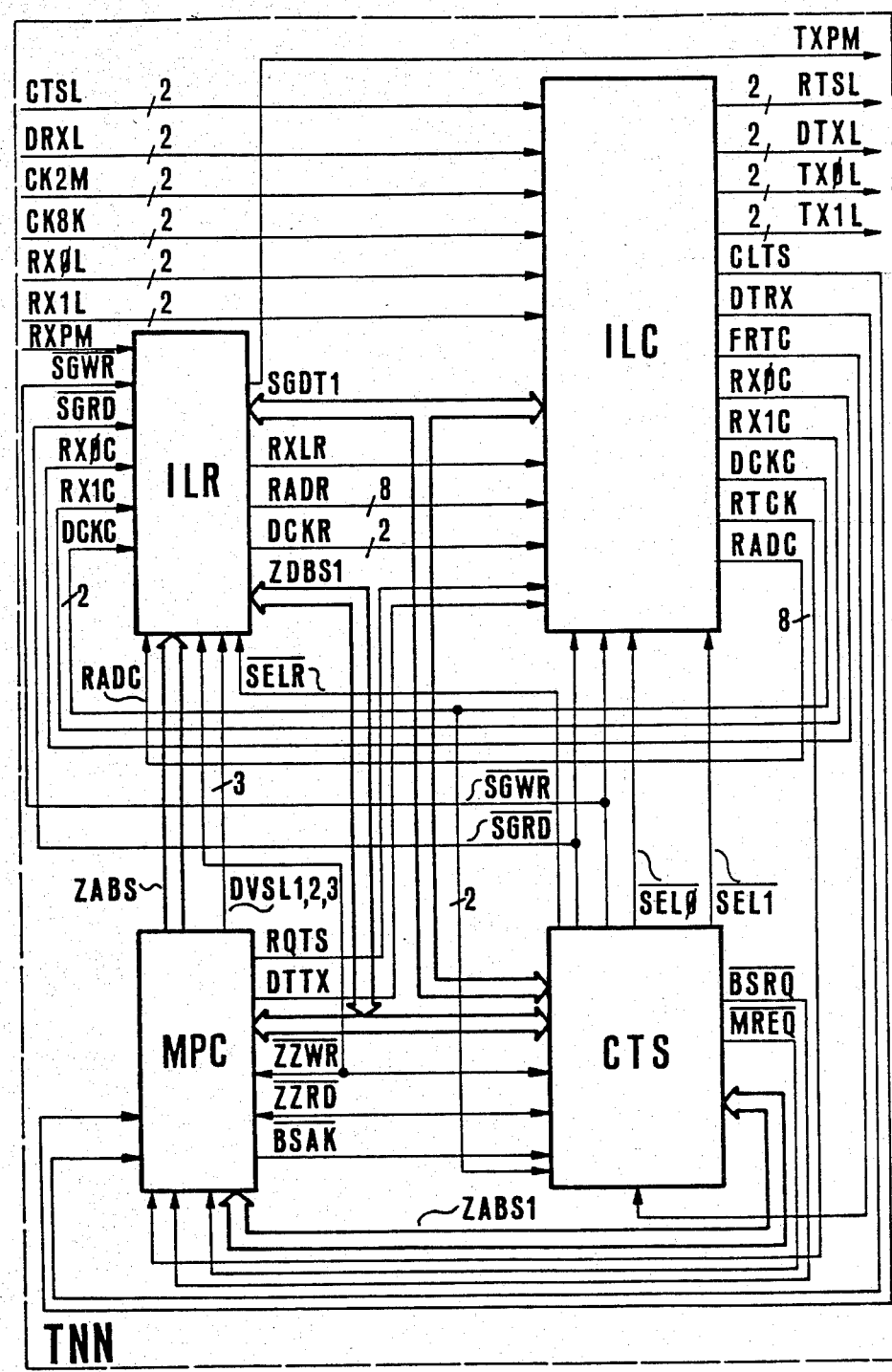
FIG. 28 is a block diagram of unit TNN shown in FIG. 27.

As shown in FIG. 28, the input/output signals of terminal TNN are:

RXPM, TXPM: 2.048-Mbits/s. PCM frame (network-side) line;

RX∅L, TX∅L: PCM (line FGG∅ ) connection with one of the modules MII;

RX1L, TX1L: PCM (line FGG1) connection to the other module MII;

CK2M, CK8K: synchronizing signals (2 MHz, 8 MHz) from pulse generator CKC;

DTXL, DRXL, RTSL, CTSL: data channel leading to the supervisory unit SGS.

Terminal TNN is composed of our functional modules:
network-side line interface ILR;
exchange-side line interface ILC;
signalization controller CTS;
microprocessor MPC.

The signal RXPM is received by interface ILR which proceeds to:
extract the network-side clock (DCKR),
search for the network-side frame-synchronizing clock,
generate the network-side address-receiving clock,
convert signal RXPM into the TTL signal RXLR.

Interface ILR also receives the two signals RX∅C and RX1C (sent from modules MII through interface ILC) and, using the exchange-side clocks DCKC and RADC, synchronizes them with the network-side clock.

The signals $\overline{\text{SGRD}}$, $\overline{\text{SGWR}}$, $\overline{\text{SELR}}$ coming from controller CTS serve to extract or insert, in parallel form, on bus SGDT1 the network-side signalization received or transmitted by interface ILR in time slot No. 16 of the frame of signals RXPM, TXPM.

The signals ZABSI, ZDBS1, $\overline{\text{ZZWR}}$, $\overline{\text{DVSL1}}$, $\overline{\text{DVSL2}}$, $\overline{\text{DVSL3}}$ deriving from microprocessor MPC are used to control the operation of interface ILR in transmission in such a manner that each channel TXPM may be chosen indifferently as:
an RX∅C channel,
an RX1C channel,
a rest channel,
a "tone" channel (8000/19-Hz tone, in digital form),
a "pause" channel (zero signal).

Unit ILC receives the system-timing pulses CK2M and CK8K of the centralized clock CCK and generates both the exchange-side clocks DCKC, RADC and the real-time clock RTCK controlling the processor MPC (a pulse every 2 msecs.).

Unit ILC further receives the two signals RX∅L and RX1L from the modules MII and converts them at TTL level to signals RX∅C and RX1C, performing also the reception and extraction of the signalization characters present in time slot No. 16 of each channel.

After having received the signal RXLR from the network-side line (through unit ILR), unit ILC carries out its synchronization according to the exchange-side clock, using for this purpose the signals RADR and DCKR. The signal RXLR thus synchronized is sent to the two modules MII#∅ and MII#1, connected to terminal TNN, as signals TX∅L and TX1L after unit ILC has inserted into the channels the signalization characters derived from controller CTS.

The signals $\overline{\text{SGRD}}$, $\overline{\text{SGWR}}$, $\overline{\text{SEL∅}}$, $\overline{\text{SEL1}}$ are used to extract or insert in parallel form, as signal SGDT1, the signalization characters received or transmitted by unit ILC in time slot No. 16 of the frame of signals RX∅L, RX1L, TX∅L, TXIL.

Unit ILC also performs the translation of the data signals DTTX, RQTS, DRXL, CTSL into the signals DTRX, CLTS, DTXL, RTSL, from TTL level to balanced signal, and vice-versa.

Controller CTS, which operates in a manner completely analogous to that of functional unit SGDMA (FIG. 10) of the routing module, extracts and inserts in parallel form the signalization characters received and transmitted through bus SGDT1, using the control signals $\overline{\text{SELR}}$, $\overline{\text{SEL∅}}$, $\overline{\text{SEL1}}$, $\overline{\text{SGRD}}$, $\overline{\text{SGWR}}$. The controller then transfers the characters from and to the memory of microprocessor MPC in Direct Access mode (DMA), using the control signals $\overline{\text{BSRQ}}$, $\overline{\text{BSAK}}$, $\overline{\text{MREQ}}$, $\overline{\text{ZZWR}}$, $\overline{\text{ZZRD}}$ and the data and address buses ZDBS1 and ZABS1.

For timing its operation, controller CTS makes use of the clock DCKC and the 8-KHz signal FRTC.

The operation of controller CTS differs from that of unit SGDMA only in that:
it operates on only three PCM channels, two on the exchange side and one on the network side;
for the network-side channel it always performs DMA transfer to or from the memory of processor MPC.

The microprocessor MPC carries out all the interpreting functions of the messages coming from the modules MII and of the signals coming from the network-side PCM line, and, as a consequence, the generation of response messages and signals.

Processor MPC also has the task of establishing the status of interface ILR in accordance with the status of the existing connections on the 30 channels RXPM, TXPM, that is to command the generation of the 8000/19-Hz tone in unit ILR.

Figure 29:
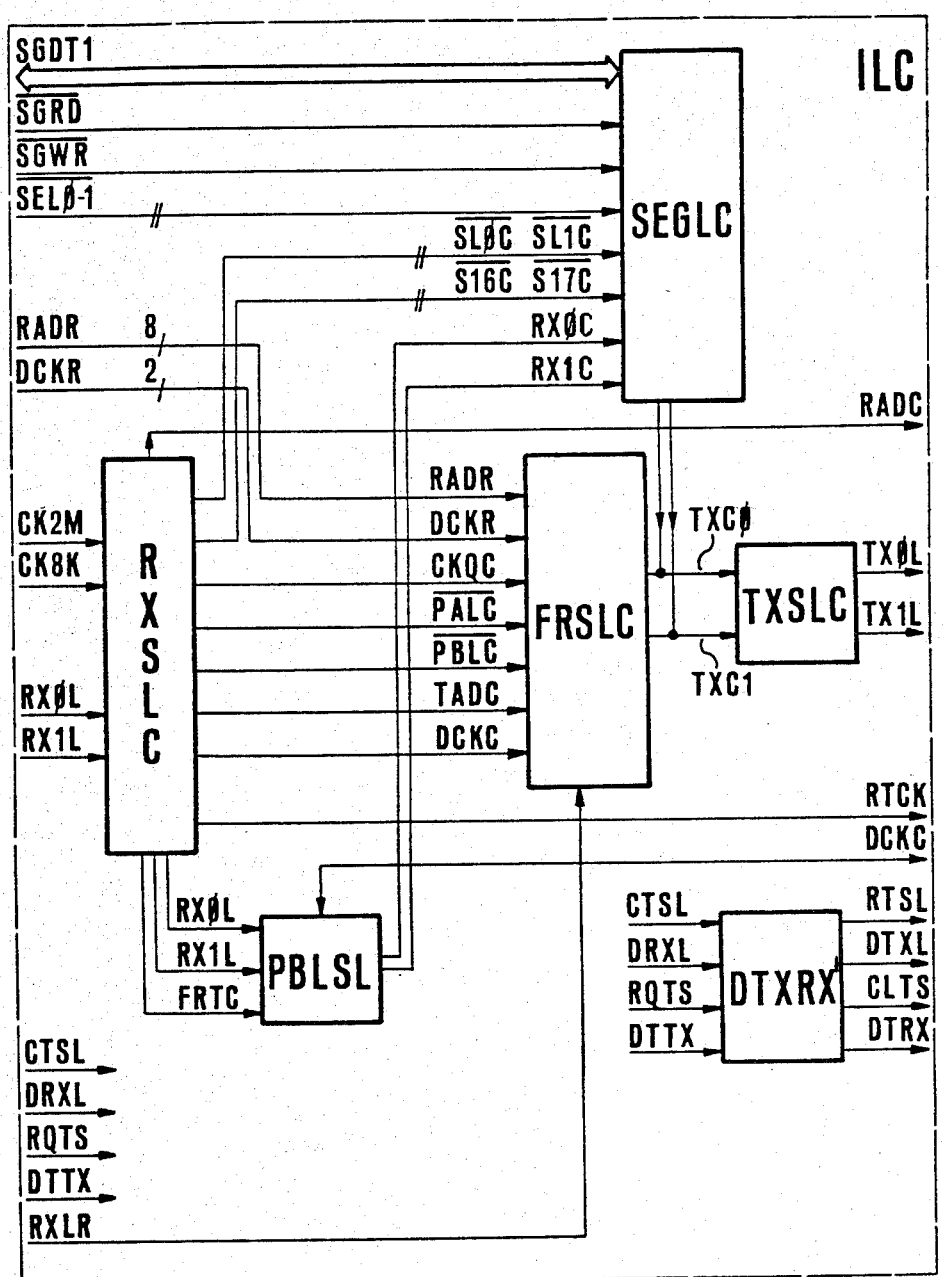
FIG. 29 is a block diagram of unit ILC shown in FIG. 28.

In FIG. 29 the block diagram of the exchange-side interface ILC is seen to comprise 6 functional modules:

(a) A circuit RXSLC which receives both the signals RX∅L, RX1L coming from the two modules MII to which terminal TNN is connected, and the system-timing pulses CK2M (2 MHz) and CK8K (8 KHz) coming from the centralized clock CKC. Besides converting the received signals from balanced signals to TTL level, circuit RXSLC also generates the "exchange side" timing signals:

DCKC, 2-MHz clock;
FRTC, 8-MHz clock;
RADC, reception address or number of the current bit of the incoming frame;
TADC, transmission address or number of the current bit of the outgoing frame;
$\overline{\text{CKQC}}$, $\overline{\text{PALC}}$, $\overline{\text{PBLC}}$, bit-synchronizing signals;
$\overline{\text{SL∅C}}$, $\overline{\text{SL1C}}$, $\overline{\text{S16C}}$, $\overline{\text{S17C}}$, signals of time slots Nos. 0, 1, 16, 17;
RTCK, real-time clock signal (2 msecs.).

(b) A circuit PBLSL which introduces whole-bit on fraction-of-bit delays on signals RXØL, RX1L in such a manner that signals RXØC, RX1C are delayed by exactly 8 bits with reference to the instant of transmission. Circuit PBLSL operates in a mode identical to that of unit PBADJ (FIG. 5) of module ILN, the only difference being that it operates on only two channels instead of eight.

(c) A circuit FRSLC which synchronizes with the exchange clock the signal RXLR received on the network side; for this purpose it makes use of the signals RADR and DCKR (network-side synchronism) and CKQC, $\overline{PALC}$, $\overline{PBLC}$, TADC, DCKC (exchange-side synchronism). The two signals TXCØ and TXC1 are mutually alike and have the same content as signal RXLR (time slots 1, ..., 15 and 17, ..., 31).

(d) A circuit SEGLC which receives the signalization byte from signals RXØC and RX1C and inserts both these bytes and the synchronizing bytes into signals TXCØ and TXC1. The received bytes are transferred in parallel form onto bus SGDT1 when signal $\overline{SGRD}$ and either signal $\overline{SEL0}$ or $\overline{SEL1}$ are active at the same time; in the first case the byte received from signal RXØC will be transferred, in the second case the one received from signal RX1C.

In the same manner, transfer of data from bus SGDT1 to circuit SEGLC will be performed when signal $\overline{SGWR}$ and one of the two selection signals $\overline{SEL0}$, $\overline{SEL1}$ are both active (byte to be transmitted into time slot No. 16 of signal TXCØ or TXC1).

(e) A circuit TXSLC which converts signals TXCØ and TXC1 (TTL level) into the balanced signals TXØL, TX1L.

(f) A circuit DTXRX', which converts the data-channel signals from TTL level to balanced signals and vice-versa, is identical to the unit DTXRX of interface ILN (FIG. 3).

Figure 30:
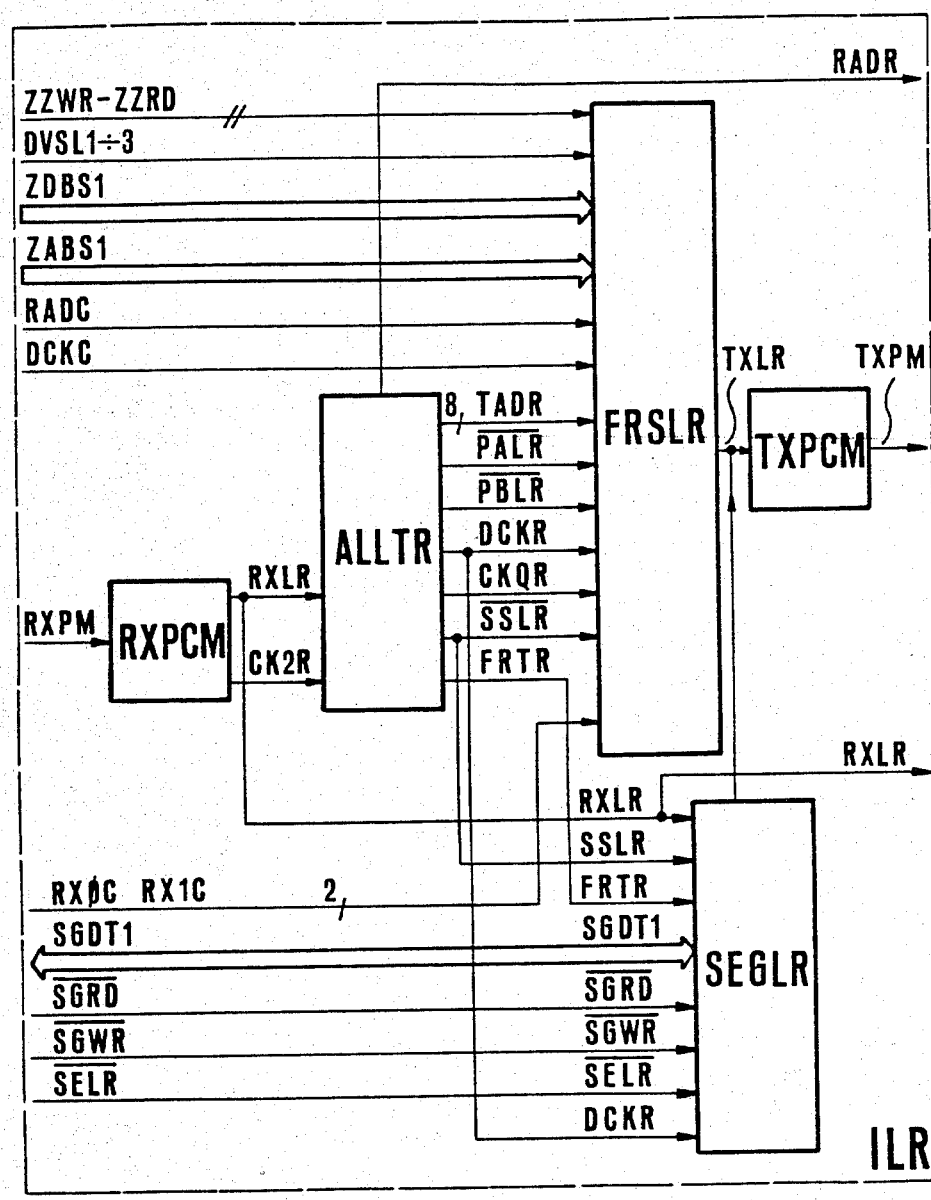
FIG. 30 is a block diagram of unit ILR shown in FIG. 28.

In FIG. 30 there is illustrated a block diagram of network-side interface ILR which consists of 5 functional units:

(a) A circuit RXPCM which receives the incoming signal on line RXPM, converts it to TTL level as signal RXLR and extracts the clock CK2R.

(b) A circuit ALLTR which searches for the frame-synchronizing pulse in signal RXLR and generates the various "network side" timing signals:
DCKR, 2-MHz clock;
FRTR, 8-KHz clock;
RADR, reception address or number of the current bit of incoming signal RXLR;
TADR, transmission address or number of the current outgoing bit;
CKQR, $\overline{PALR}$, $\overline{PBLR}$, bit-synchronizing signals;
$\overline{SSLR}$, enabling signals for transmission of time slots Nos. 0 and 16.

(c) A circuit FRSLR which generates, starting from signals RXØC, RX1C sent by modules MII through interface ILC, the outgoing PCM signal TXLR. Circuit FRSLR is operated by the microprocessor through the buses ZDBS1 and ZABS1 and the control signals DVSL1, 2, 3 and ZZRD, ZZWR in such a manner that each channel on PCM line TXPM may be selectively connected to the corresponding channel of signal RXØC or RX1C or may contain a digital signal equivalent to an 8000/19-Hz sinusoidal tone, a zero signal, or a fixed configuration of "free channel".

(d) A circuit SEGLR which extracts the signalization byte corresponding to time slot No. 16 from signal RXLR and inserts this byte into time slot No. 16 of signal TXLR and the synchronizing byte into time slot No. 0. The byte read out is transferred onto bus SGDT1 when the control signals $\overline{SGRD}$ and $\overline{SELR}$ coincide; the byte present on line SGDT1 is written in circuit SEGLR, for subsequent serial transfer to signal TXLR, when the control signals $\overline{SGWR}$ and $\overline{SELR}$ coincide.

(e) A circuit TXPCM which converts the TTL signal coming from circuit FRSLR (time slots Nos. 1, ..., 15 and 17, ..., 31) or from circuit SEGLR (time slots Nos. 0 and 16) into the line-code signal TXPM.

As far as the analog-type trunk lines are concerned, we wish to point out that the corresponding access units UGG are substantially similar to units UAA, relating to the subscribers, which are illustrated in FIGS. 23 to 26.

According to a preferred form of realization, a PCM system joined to a module MII by means of a bundle FGG is connected to eight units UGG through an interface unit DST (FIG. 23); each of these eight access units UGG is capable of serving four analog-type trunk lines each comprising two phonic wires and four signalization wires.

Figure 31:
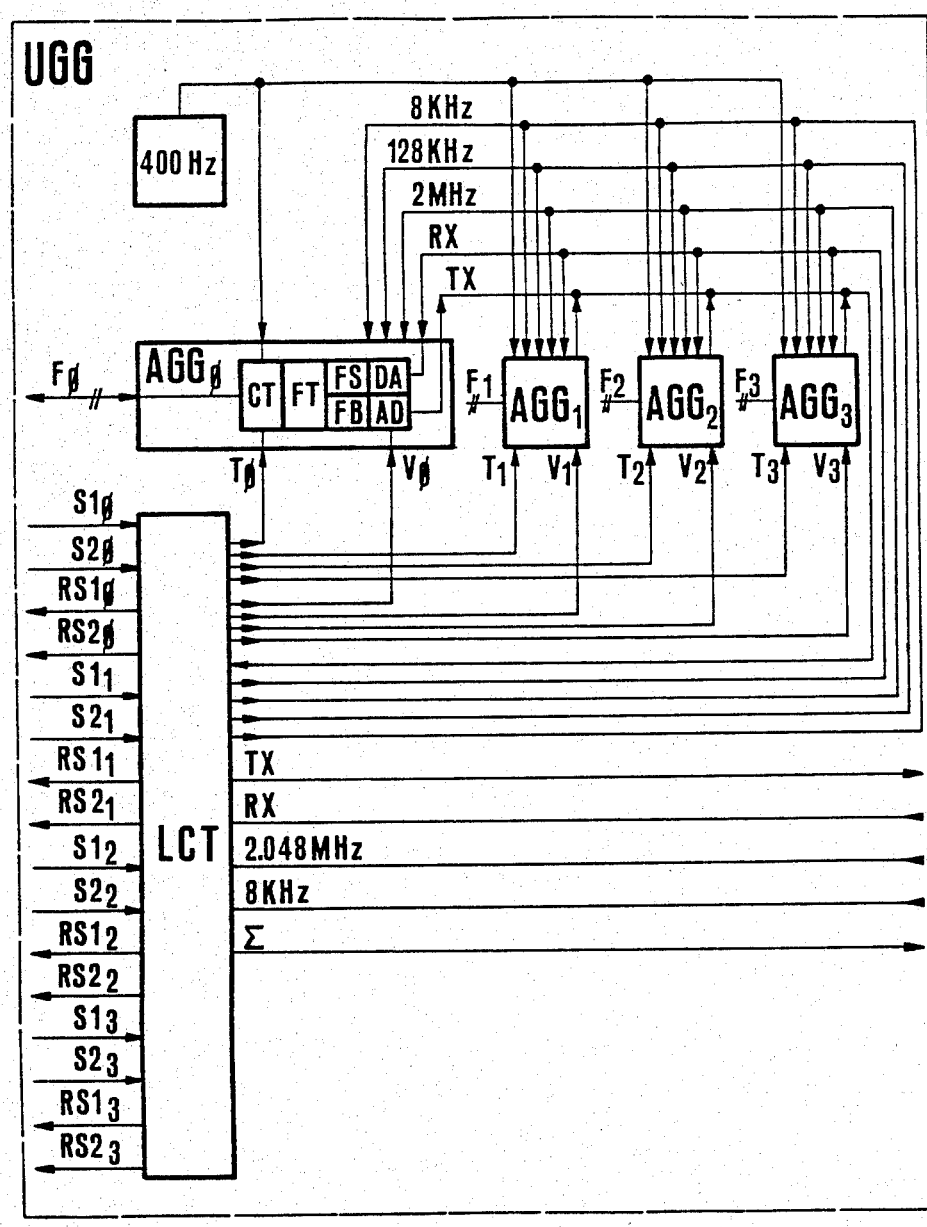
FIG. 31 is a block diagram of a unit UGG shown in FIG. 1.

In FIG. 31 the block diagram of a generic trunk interface UGG is illustrated; this interface comprises four junctions AGGø, ..., AGG3 driven by a logic circuit LCT consisting of a commercial-type microprocessor and a nonillustrated control unit that is substantially identical to the unit UCT shown in FIG. 26.

Circuit LCT receives, for each trunk line, a pair of wires S1ø, S1$_1$ and S2ø, S2$_1$ carrying the outgoing signalization. The microprocessor, together with the associated control unit, extracts the signalization from the incoming PCM system RX and forwards it onto wires RS1ø, RS1$_1$ and RS2ø, RS2$_1$ of the analog trunk involved, and also inserts in the temporal signalization channel of the outgoing PCM bundle TX the criteria received through incoming wires S1ø, S1$_1$ and S2ø, S2$_1$.

Each trunk junction AGG is substantially identical to the line junction AUU illustrated in FIG. 25 wherefore its constituent components have been marked with the same designations CT, FT, FS, FB, DA, AD.

It should be pointed out that the telephone circuits CT of junctions AGG are appreciably reduced, compared with their counterparts of FIG. 25, since hook-switch monitors, call-signal emitters, billing-signal emitters etc. are not required for the analog trunks.

Circuit LCT supplies a signal Tø–T$_3$ to each trunk junction, thereby causing a 400-Hz tone to be sent onto the voice loops Fø–F$_3$, and also makes the signal Vø–V$_3$ available to activate the converters AD–DA.

We claim:
1. A digitally operating telephone exchange comprising:
a switching assembly (AC) including a multiplicity of mutually identical routing modules (MII) interconnected by PCM lines (FII) giving each module direct access to some of the other modules;
first interface means (UAA) connected to certain of said routing modules and providing same with access to respective sets of subscriber lines;
second interface means (TNN) connected to other of said routing modules providing same with access to respective digital trunks extending to remote exchanges;
third interface means (UGG) connected to further of said routing modules and providing same with access to respective analog trunks;

centralized oscillation-generating means (GC) connected to said first interface means for supplying same with ringing current and with a modulable audio-frequency signalization carrier;

supervisory processing means (SGS) connected to all said routing modules and to said second interface means for controlling the operations thereof; and centralized timing means (CKC) connected via a data channel to all said routing modules and to said second interface means for synchronizing the operations thereof;

each routing module including circuitry for receiving incoming messages from PCM lines and interface means connected thereto and for transmitting outgoing messages to the PCM lines and to the interface means connected thereto.

2. A telephone exchange as defined in claim 1 wherein said second interface means (TNN) comprises a plurality of trunk terminals each connected to two of said routing modules (MII).

3. A telephone exchange as defined in claim 1 wherein each routing module is provided with two bidirectional connections to respective interface means and with a larger number of PCM lines extending to adjoining modules.

4. A telephone exchange as defined in claim 1 wherein each of said routing modules (MII) comprises:

a line-interface unit (ILN) designed to convert digital words of incoming PCM channels, received in balanced form through an input bus (RRCL), and from said data channel (CTSL, DCRL) into TTL level and to convert digital words allocated to outgoing PCM channels and to said data channel from TTL level to balanced form;

a microprocessor (MPI) designed to supervise the operation of the respective routing module (MII);

a switching unit (MTC) designed to transfer digital words of incoming PCM channels to as many outgoing PCM channels in response to information received from said microprocessor (MPI);

a signaling unit (SGC) designed to recognize, and send to the microprocessor (MPI), signalization messages received in time slots of incoming PCM channel groupings and to insert messages generated by the microprocessor along with a frame-synchronizing character into assigned time slots of outgoing PCM channel groupings;

a unidirectional first bus (RXCN) connecting said line-interface unit (ILN) to said signaling unit (SGC) and said switching unit (MTC);

a unidirectional second bus (TXCN) connecting said switching unit (MTC) and said signaling unit (SGC) to said interface unit (ILN);

a unidirectional data bus (ZDBS) interconnecting all said units (ILN, MPI, SGC, MTC); and an address bus (ZABS) connecting said signaling unit (SGC) to said microprocessor (MPI) and the latter to said switching unit (MTC).

5. A telephone exchange as defined in claim 4 wherein said line-interface unit (ILN) comprises:

local timing means (ILNTG) for obtaining internal timing signals of said interface unit (ILN) and other timing signals for further units of the routing module (MII) from clock pulses (CK2M-CK8K) provided by said centralized timing means (CKC);

a first conversion unit (ILNTX) designed to receive signals at TTL level from said second bus (TXCN) and convert them into balanced signals, forwarding them onto an output bus (TTCL);

a second conversion unit (ILNRX) designed to receive balanced PCM signals from said input bus (RRCL) and convert them to TTL level, forwarding them onto said first bus (RXCN), and to align said incoming digital words with one another;

a third conversion unit (DTXRX) designed to convert the signals present on said data channel from TTL form to balanced form and vice versa; and monitoring means (CNTST) for receiving signals present on said first (RXCN) and second (TXCN) buses, on said data bus (ZDBS), on a third bus (RRCC) coming from said second conversion unit (ILNRX) and on a fourth bus (TTCC) coming from said first conversion unit (ILNTX), and for checking the correct functioning of said first and second conversion units (ILNTX and ILNRX), with emission of an alarm signal ($\overline{INT1}$) to said microprocessor (MPI) upon detecting an absence of TTL-level signal transitions.

6. A telephone exchange as defined in claim 5 wherein said second conversion unit (ILNRX) comprises:

first means (CNLRX) for conveying PCM signals (RRCL 0, ..., 7) coming from said input bus (RRCL) from balanced form to TTL level; and second means (PBADJ) for imparting a delay of a fraction of a bit period to signals emitted by said first means, received through a unidirectional fifth bus (RRCN), thus aligning them with a timing-pulse sequence (DCLK) generated by said local timing means (ILNTG), said second means further introducing an additional delay equal to a whole number of bits in order to align the starts of PCM frames with one another and to forward the resultant signals onto said first bus (RXCN).

7. A telephone exchange as defined in claim 5 wherein said signaling unit (SGC) comprises:

other timing means (SGTMG) for receiving equipment-timing means (DCLK, FRTX) from said local timing means (ILNTG) and generating timing signals for said signaling unit (SGC), as well as an inhibit signal (MINH) for said switching unit (MTC) during signalization time slots Nos. 0 and 16 of each PCM grouping of 32 time slots;

synchronization-control means (INSLZ) for inserting the frame-synchronizing character onto said second bus (TXCN) in the presence of time slot No. 0 of each PCM grouping; and signalization-control means (SGRTX) for extracting messages arriving in the signalization time slots of incoming PCM groupings received via said first bus (RXCN), forwarding them to a monitoring unit (SGMRT) and a direct-memory-access unit (SGDMA) through a further bidirectional bus (SGDT), and for receiving from said direct-memory-access unit (SGDMA), via said further bus (TXCN), messages to be inserted in the signalization time slots of the PCM groupings present on said second bus (TXCN);

said direct-memory-access unit (SGDMA) supervising the exchange of messages, through said data bus (ZDBS), between said microprocessor (MPI) and said signalization-control means (SGRTX);

said monitoring unit (SGMRT) checking whether or not characters transmitted and received by said signalization-control means (SGRTX) through said further bus (SGDT) correspond with those respectively present on said first (RXCN) and second (TXCN) buses.

8. A telephone exchange as defined in claim 7 wherein said synchronization-control means (INSLZ) comprises a multiplexer (MX8) having a control input connected to said other timing means (SGTMG), said multiplexer having a signal input wired to a source of a predetermined binary configuration and having an output connected to register means (RG8) enabled in the No. 0 time slot by a signal from said other timing means (SGTMG), said register means having outputs connected to said second bus (TXCN).

9. A telephone exchange as defined in claim 7 wherein said signalization-control means (SGRTX) comprises:
  a plurality of input registers ($SI_{90}, \ldots, SI_{97}$) designed to store data from respective PCM channels received through said first bus (RXCN) upon command (SRXK) of said other timing means (SGTMG);
  decoding means ($DC_9$) having a first section ($DC_{91}$) and a second section ($DC_{92}$), said first section enabling a transfer of the contents of said input registers (SI) to said further bus (SGDT) in response to an address configuration (SADS) and a first signal ($\overline{RXEN}$) provided by said direct-memory-access unit (SGDMA);
  a plurality of output registers ($SU_{90}, \ldots, SU_{97}$) connected to said further bus (SGDT) for receiving data therefrom under the control of said second section ($DC_{93}$), in the presence of a second signal (DDWR) from said direct-memory-access unit (SGDMA), and responsive to a signal (STXK) from said other timing means (SGTMG) for reading out the data received; and
  register means ($RG_9$) controlled by a signal (S16T) from said other timing means (SGTMG) and inserted between said output registers (SU) and said second bus (TXCN).

10. A telephone exchange as defined in claim 7 wherein said direct-memory-access unit (SGDMA) comprises:
  further timing means (DMATG) responsive to signals (DCLK, S16R) sent by said other timing means (SGTMG) for establishing a DMA cycle for said direct-memory-access unit (SGDMA);
  a logical control unit (PRDLG) receiving memory addresses of said microprocessor from said further timing means (DMATG) updating the received addresses and sending the updated addresses to said further timing means (DMATG);
  flag-control means (DMFLG) designed to forward an interrupt request (INT) to said microprocessor (MPI) in response to a signal (SFTX, SFRX) from said logical control unit (PRDLG) and to inhibit (FLTX) the running of DMA cycles until said microprocessor (MPI) emits a signal terminating said interrupt request; and
  interfacing means (BUSCT) linked by said data and address buses (ZDBS, ZABS) and designed to perform a DMA cycle upon request of said logical control unit (PRDLG).

11. A telephone exchange as defined in claim 10 wherein said further timing means (DMATG) comprises:
  an OR gate ($OR_{11}$) receiving timing pulses (DCLK) from said other timing means (SGTMG) and an inhibit signal (WAIT) from said interfacing means (BUSCT);
  a first counter ($CN_{111}$) made to advance by the output of said OR gate;
  a flip-flop ($FF_{11}$) a settable by a signal ($\overline{S16R}$) emitted by said other timing means (SGTMG);
  an AND gate ($AND_{11}$) having one input connected to receive timing pulses (DCLK) from said other timing means (SGTMG) and having another input connected to an output of said flip-flop ($FF_{11}$);
  a multiplexer ($MX_{11}$) with a multiplicity of outputs, with an address input connected to the output of said first counter ($CN_{111}$), and with a data input connected to the output of said AND gate ($AND_{11}$);
  a second counter ($CN_{112}$) with a counting input connected to the last output of said multiplexer ($MX_{11}$) and with an enabling input connected to the output of said flip-flop ($FF_{11}$) for identifying the number of a PCM channel involved in the running of a DMA cycle as well as the direction of transit thereof with reference to said microprocessor (MPI);
  a first and a second random-access memory ($MM_{111}$, $MM_{112}$) having address inputs connected to the outputs of said second counter ($CN_{112}$) and having data inputs receiving digital words (NPTR) provided by said logical control unit (PRDLG); and
  further register means ($RG_{11}$) having inputs connected to the outputs of said first and second memories ($MM_{111}$, $MM_{112}$) and outputs (OPTR) connected to respective inputs of said logical control unit (PRDLG).

12. A telephone exchange as defined in claim 11 wherein said interfacing means (BUSCT) comprises:
  additional timing means (BUTG) designed to generate signal to be sent to said microprocessor (MPI) and said inhibiting signal (WAIT) from signals emitted by said further timing means (DMATG);
  a second AND gate ($AND_{14}$) receiving a signal (BSAK), emitted by the microprocessor (MPI) to enable a DMA cycle, as well as a bus-access-request signal (BSRQ) generated by said additional timing means (BUTG);
  additional register means (CRG) designed to transfer the addresses (NRCN, OPTR) available at the output of said further timing means (DMATG) to said address bus (ZABS); and
  a bidirectional buffer (BB) designed to send signals to said data bus (ZDBS) from said further bus (SGDT), and vice versa, in response to the logical level of a signal (RXEN) provided by said further timing means (DMATG) in the presence of an output signal of said second AND gate ($AND_{14}$).

13. A telephone exchange as defined in claim 11 wherein said flag-control means (DMFLG) comprises:
  a third memory ($MM_{161}$) with a multiplicity of cells assigned to respective PCM channels, with an address input receiving signals (NCRN) emitted by said further timing means (DMATG) and with a signal input receiving a pulse ($\overline{SFRX}$) emitted by said logical control unit (PRDLG);
  a first register complex ($RG_{161}$) designed to transfer the contents of said third memory to said data bus (ZDBS) in response to an output signal of a second OR gate ($OR_{161}$), receiving read signals (ZZRD and $\overline{DVSL4}$) emitted by the microprocessor (MPI);

a second flip-flop ($FF_{161}$), settable by the pulse ($\overline{SFRX}$) present at the signal input of said third memory ($MM_{161}$), to generate a second interrupt request ($\overline{INT4}$) for the operative program of said microprocessor (MPI);

a third OR gate ($OR_{162}$) receiving signals ($\overline{DVSL4}$, $\overline{ZZWR}$) emitted by the microprocessor (MPI) for resetting said second flip-flop ($FF_{161}$) and clearing said third memory ($MM_{161}$);

a fourth memory ($MM_{162}$) with a multiplicity of cells assigned to respective PCM channels, with an address input connected in parallel with that of said third memory ($MM_{161}$) for receiving the signals (NCRN) emitted by said further timing means (DMATG) and with a signal input receiving a pulse ($\overline{SFTX}$) emitted by said logical control unit (PRDLG);

a second register complex ($RG_{162}$) designed to transfer the contents of said fourth memory ($MM_{162}$) to said data bus (ZDBS) in response to an output signal of a fourth OR gate ($OR_{164}$) receiving signals ($\overline{DVSL5}$, $\overline{ZZRD}$) emitted by the microprocessor (MPI);

a third flip-flop ($FF_{162}$) settable by the pulse ($\overline{SFTX}$) present at the signal input of said fourth memory ($MM_{162}$) to generate a third interrupt request ($\overline{INT5}$) for the operative program of said microprocessor (MPI);

a fifth OR gate ($OR_{163}$) receiving signals ($\overline{DVSL5}$ and $\overline{ZZWR}$) emitted by the microprocessor (MPI) for resetting said third flip-flop ($FF_{162}$) and clearing said fourth memory ($MM_{162}$);

a third register complex ($RG_{163}$) with a multiplicity of cells designed to receive a disabling mask from said microprocessor (MPI) through said data bus (ZDBS); and another multiplexer ($MX_{16}$) receiving the addresses (NCRN) provided by said further timing means and including a first half ($MX_{161}$) and a second half ($MX_{162}$) with signal inputs respectively receiving signals present at the output of said third register complex ($RG_{163}$) and those present at the output of said fourth memory ($MM_{162}$) in the presence of an output signal of said fifth OR gate ($OR_{163}$), said first and second halves having outputs connected to inputs of a sixth OR gate ($OR_{165}$) for disabling said logical control unit (PRDLG) to run a DMA cycle.

14. A telephone exchange as defined in claim 5 wherein said switching unit (MTC) has a first subdivision (MTXC) designed to perform switching of PCM channels and controlled by a second subdivision (MXCTR), said second subdivision (MXCTR) comprising:

a first timing unit (MXTMG) deriving timing signals for said switching unit (MTC) from signals provided by said local timing means (ILNTG);

an image memory (MMIMM) in which said microprocessor (MPI) writes and updates, through said data bus (ZDBS) and said address bus (ZABS), a map of connections to be established, the signals present on the output of the image memory controlling the switching of the PCM samples in said first subdivision (MTXCP); and a monitoring unit (MXMRT) designed to receive the number of a PCM channel to be tested from the microprocessor (MPI) through said data bus (ZDBS) and the destination address of the tested PCM channel from said image memory (MMIMM), to extract the contents of the tested PCM channel from said first (RXCN) and second (TXCN) buses, and to emit an interrupt request ($\overline{INT2}$) upon detecting a lack of identity of data received from said buses.

15. A telephone exchange as defined in claim 5 wherein said monitoring means (CNTST) comprises:

a multiplexer ($MX_{20}$) with data inputs receiving signals present on said first (RXCN) and second (TXCN) buses along with two control signals (RRCC, TTCC);

a register ($RG_{20}$) with inputs connected to said data bus (ZDBS) and outputs connected to an addressing input of said multiplexer ($MX_{20}$);

an AND gate ($AND_{20}$) receiving signals ($\overline{DVSL0}$ and $\overline{ZZWR}$) emitted by the microprocessor (MPI) to enable said register ($RG_{20}$) for writing; and a monostable circuit ($MN_{20}$) having an input connected to the output of said multiplexer ($MX_{20}$) and a release time exeeding the time interval between two consecutive PCM signal pulses, a resetting of said monostable circuit generating said alarm signal ($\overline{INT1}$) in the absence of said TTL-level signal transitions.

16. A telephone exchange as defined in claim 10 wherein said monitoring means (SGMRT) comprises:

four-stage counting means ($CN_{21}$) made to advance by an incremental pulse (INCR) from said other timing means (SGTMG) in the presence of a signalization time slot of any PCM grouping;

first and second multiplexer means ($MX_{211}$ and $MX_{212}$) addressed by the three least-significant outputs of said four-stage counting means ($CN_{21}$) and provided with inputs respectively connected to said first (RXCN) and second (TXCN) buses;

third, fourth and fifth multiplexer means ($MX_{213}$, $MX_{214}$ and $MX_{215}$) addressed by the most-significant output of said four-stage counting means ($CN_{21}$) and provided with inputs respectively connected to the outputs of said first and second multiplexer means ($MX_{211}$ and $MX_{212}$), to said other timing means (SGTMG) for receiving reception-timing signals (SRXK) and transmission-timing signals (K16T) therefrom, and through a pair of AND gates ($AND_{211}$, $AND_{212}$) to said microprocessor (MPI) for receiving two strobe signals (DDRD, DDWR);

a first comparator ($CM_{211}$) receiving on one input signals from the three least-significant outputs of said four-stage counting means ($CN_{21}$) and on another input a digital word (SADS0, ..., SADS2) emitted by said further timing means (DMATG) to identify a PCM channel to be checked, said first comparator unblocking said pair of AND gates ($AND_{211}$, $AND_{212}$) in the presence of a coincidence;

a shift register ($SR_{21}$) connected to the output of said third multiplexer ($MX_{213}$) and stepped by pulses emitted by said fourth multiplexer ($MX_{214}$);

other register means ($RG_{211}$) enabled by an output signal of said fifth multiplexer ($MX_{215}$) and provided with an input connected to said further bus (SGDT);

a second comparator ($CM_{212}$) connected to outputs of said shift register ($SR_{21}$) and of said other register means ($RG_{212}$) for emitting a blocking pulse in response to an absence of identity of the respective output signals thereof;

another AND gate ($AND_{213}$) inserted between said other timing means and said four-stage counting means ($CN_{21}$) for preventing the latter in the presence of said blocking pulse from receiving said incremental pulse (INCR);

a flip-flop ($FF_{21}$) settable by said incremental pulse (INCR) through a further AND gate ($AND_{214}$), enabled by said blocking pulse, for sending another interrupt request ($\overline{INT3}$) to said microprocessor (MPI);

gating means ($AND_{215}$) receiving signals (ZZRD, DVSL3) from said microprocessor (MPI) for resetting said flip-flop ($FF_{21}$); and further register means ($RG_{212}$) with inputs connected to the outputs of said four-stage counting means ($CN_{21}$) and with outputs connected to said data bus (ZDBS) for supplying the latter with the count of said four-stage counting means under the control of said gating means ($AND_{215}$) concurrently with the resetting of said flip-flop ($FF_{21}$).

17. A telephone exchange as defined in claim 14 wherein said monitoring unit (MXMRT) comprises:

a first register ($RG_{221}$) designed to store a digital word of 8 bits sent by said microprocessor (MPI) by means of said data bus (ZDBS);

an AND gate ($AND_{221}$) enabling said first register ($RG_{221}$) in the presence of signals (DVSL2, ZZWR) emitted by the microprocessor (MPI);

a first comparator ($CM_{221}$) designed to compare a signal present on the output of said first register ($RG_{221}$) with a binary configuration (BYNR) generated by said first timing unit (MXTMG);

a second register ($RG_{222}$) enabled by said first comparator ($CM_{221}$) to store a signal (BYAD) present on the output of said image memory (MMIMM);

a second comparator ($CM_{222}$) designed to compare bits present on the five least-significant outputs of said second register ($RG_{222}$) with a binary configuration (BTAD) emitted by said first timing unit (MXTMG);

a first timing-signal generator ($GST_1$) activated by an output of said second comparator ($CM_{222}$) to emit eight clock pulses;

a third comparator ($CM_{223}$) designed to compare bits present on the five least-significant outputs of said first register ($RG_{221}$) with the binary configuration (BTAD) emitted by said first timing unit (MXTMG);

a second timing-signal generator ($GST_2$) activated by an output of said third comparator ($CM_{223}$) to emit eight clock pulses;

a first multiplexer ($MX_{221}$) with an address input receiving the three most-significant bits present on the output of said first register ($RG_{221}$) and with data inputs connected to said first bus (RXCN);

a second multiplexer ($MX_{222}$) with an address input receiving the three most-significant bits present on the output of said second register ($RG_{222}$) and with data inputs connected to said second bus (TXCN);

a third register ($SR_{223}$) timed by said second timing-signal generator ($GST_{22}$) to store a digital signal present on the output of said first multiplexer ($MX_{221}$);

a fourth register ($SR_{224}$) timed by said first timing-signal generator ($GST_1$) to store a digital signal present on the output of said second multiplexer ($MX_{222}$);

a fourth comparator ($CM_{224}$) designed to compare digital signals present in said third and fourth registers ($SR_{223}$ and $SR_{224}$) with each other; and a flip-flop ($FF_{22}$) settable by a signal present on the output of said fourth comparator ($CM_{224}$) and resettable by a signal present on the output of said AND gate ($AND_{221}$) to emit a interrupt request ($\overline{INT2}$) to said microprocessor (MPI) upon being set.

18. A telephone exchange as defined in claim 1 wherein said first interface means (UAA) includes a plurality of groups of access units ($UAA_1, \ldots, UAA_{32}$) and a conversion unit (DST) inserted between the access units of said groups and an associated routing module (MII) for converting TTL-level signals to balanced signals and vice versa, each access unit ($UAA_1$–$UAA_{32}$) comprising:

a plurality of subscriber junctions ($AUU_\emptyset, \ldots, AUU_3$) each connected to a respective subscriber loop (a, b) and to said oscillation-generating means (GC); and a logic unit (LCT) provided with an internal microprocessor (MIP) and with control circuitry (UCT) designed to exchange signalization information with the associated routing module (MII), to receive hook-switch criteria (G) from said subscriber junctions (AUU) and to emit command signals (C) to said subscriber junctions.

19. A telephone exchange as defined in claim 18 wherein each subscriber junction (AUU) comprises:

analog/digital and digital/analog conversion means (AD–DA) controlled by signals (V, PD) emitted by said logic unit (LCT);

filter means (FS,FB) designed to limit the bandwidth of phonic signals passing along the associated subscriber loop (a,b); and telephone circuits (CT) connected to said filter means (FS,FB) via a hybrid coil (FT) and driven by said command signals (C) for sending telephonic signals onto the associated subscriber loop (a,b) and for detecting the presence of said hook-switch criteria (G).

20. A telephone exchange as defined in claim 18 wherein said control circuitry (UCT) comprises:

a series-parallel converter (SP) receiving incoming PCM signals and having an output connected to a bidirectional bus (ADD) which is also connected to said internal microprocessor (MIP);

first decoding means ($DC_{261}$) activated in the 16th time slot of a PCM frame of 32 time slots and provided with inputs connected to said bidirectional bus (ADD);

a first flip-flop ($FF_{261}$) resettable by a signal (ETX) from a first output of said first decoding means ($DC_{261}$) in response to the presence of a control byte on said bidirectional bus;

a first gate circuit ($AND_{261}$) connected to an output of said first flip-flop ($FF_{261}$) and rendered conductive by a signal ($S_{16}$) occurring in said 16th time slot for sending a first interrupt request(INTRX) to said internal microprocessor (MIP);

a second and a third gate circuit ($AND_{262}$, $AND_{263}$) having parallel inputs connected to the output of said first flip-flop ($FF_{261}$) and having other inputs respectively connected to a second and a third output of said first decoding means ($DC_{261}$);

a second flip-flop (FF$_{262}$) having setting and resetting inputs respectively connected to said second and third gate circuits (AND$_{262}$, AND$_{263}$) to generate a reset signal for said internal microprocessor (MIP);

a first comparator (CM$_{261}$) enabled in said 16th time slot of each PCM frame to compare a calling code (IND) of said control circuitry (UCT) with a binary configuration present on said bidirectional bus (ADD) for setting said first flip-flop (FF$_{261}$);

a second comparator (CM$_{262}$) designed to compare the calling code (IND) of said control circuitry (UCT) with a combination of bits present on the most-significant outputs of a first counter (CN$_{261}$);

a D-type third flip-flop (FF$_{263}$) with a data input receiving a signal present on the output of said second comparator (CM$_{262}$) to generate a second interrupt request (INTTOUT) for said internal microprocessor (MIP);

a fourth gate circuit (AND$_{264}$) with inputs respectively receiving an output signal of said third flip-flop (FF$_{263}$) and the signal (S$_{16}$) occurring in said 16th time slot to generate a third interrupt request (INTTX) for said internal microprocessor (MIP);

a fifth flip-flop (FF$_{264}$) settable by a signal present on a further output of said first decoding means (DC$_{261}$) and resettable by said third flip-flop (FF$_{263}$);

a fourth gate circuit (AND$_{265}$) with inputs respectively receiving an output signal of said fourth flip-flop (FF$_{264}$) and stepping pulses for advancing said first counter (CN$_{261}$);

second decoding means (DC$_{262}$) having inputs connected to said bidirectional bus (ADD);

a parallel-series converter (PS) designed to store, in parallel, the binary configuration present of said bidirectional bus (ADD) in the presence of an output signal of said second decoding means (DC$_{262}$) and to emit it in series (TX) in the presence of said signal (S$_{16}$) occurring in said 16th time slot;

a second counter (CN$_{262}$) designed to scan the time slots of each frame and to generate said signal (S$_{16}$) occurring in said 16th time slot;

a plurality of registers (RG$_{261}$, ..., RG$_{264}$) each designed to store the binary configuration present on said bidirectional bus (ADD) in response to the activation of a respective output of said second decoding means (DC$_{262}$);

a plurality of comparators (CM$_{263}$, ..., CM$_{266}$) designed to compare the outputs of said plurality of registers with the outputs of said second counter (CN$_{262}$) and to emit the control signals (V) for said conversion means (AD-DA);

register means (RG$_{265}$) for storing an enabling mark in the form of a binary configuration present on said bidirectional bus (ADD) in response to activation of an additional output of said second decoding means (DC$_{262}$).

21. A telephone exchange as defind in claim 1 wherein said second interface means (TNN) comprises:

a network-side line interface (ILR) designed to convert incoming PCM signals from a line code to TTL level and outgoing PCM signals from TTL level to said line code, to search for an incoming frame-synchronizing signal, to generate timing signals designed to extract the contents of a signalization time slot of an incoming PCM frame (RXPM) for transmission to an internal bus (SGDT1), and to receive message signals and bytes to be inserted in the synchronizing and signalization time slots of outgoing PCM frames (TXPM);

an exchange-side line interface (ILC) designed to convert outgoing PCM signals from balanced form to TTL level, to time the emission of said outgoing PCM signals, to synchronize incoming PCM signals with locally generated timing pulses, to extract signalization messages from outgoing PCM signals (RXØL and RX1L) for transmission to said internal bus (SGDT1), and to receive from said network-side line interface (ILC) incoming PCM signals (RXLR) and signalization bytes;

an associated separate microprocessor (MPC);

a signalization controller (CTS) designed to carry out direct-access operations between a memory of said associated microprocessor (MPC) and said network-side and exchange-side line interfaces (ILR), (ILC) through said internal bus (SGTD1); and an address bus (ZABS1) connecting said signalization controller (CTS) to said associated microprocessor (MPC) and the latter to said network-side line interface (ILR), said internal bus (SGDT1) interconnecting said network-side line interface (ILR), said exchange-side line interface (ILC) and said signalization controller (CTS).

22. A telephone exchange as defined in claim 21 wherein said exchange-side line interface (ILC) comprises:

first circuit means (RXSLC) for converting outgoing PCM signals from balanced form to TTL level, to receive clock signals from said centralized timing means (CKC) and to derive the locally generated timing pulses therefrom;

circuit means (PBLSL) for delaying by a predetermined interval the PCM signals converted by said first circuit means (RXSLC);

third circuit means (FRSLC) for synchronizing the incoming data signals (RXLR), emitted by said network-side line interface (ILR), with the timing signals generated by said first circuit means (RXSLC);

fourth circuit means (TXSLC) for converting incoming PCM signals (TXØC, TX1C), emitted by said third circuit means (FRSLC), from TTL level to balanced form;

fifth circuit means (SEGLC) for inserting synchronizing and signalization bytes, received through said internal bus (SGDT1), into the data flow emitted by said third circuit means (FRSLC); and sixth circuit means (DTXRX) for performing conversions of data signals from TTL level to balanced form and vice versa.

23. A telephone exchange as defined in claim 21 wherein said network-side line interface (ILR) comprises:

first circuit means (RXPCM) for converting incoming PCM signals from line code to TTL level and extracting accompanying timing signals;

second circuit means (ALLTR) for extracting synchronizing signals from PCM signals available on the output of said first circuit means and deriving network-side timing signals therefrom;

third circuit means (FRSLR) controlled by said associated microprocessor (MPC) for deriving outgoing PCM signals from PCM signals emitted by said exchange-side line interface (ILC);

fourth circuit means (SEGLR) for extracting signalization bytes from the incoming PCM signals (RXLR) present on the output of said first circuit means, receiving signalization bytes through said internal bus (SGDT1) and inserting same into the data flow emitted by said third circuit means (FRSLR); and fifth circuit means (TXPCM) for converting outgoing PCM signals (TXPM) from TTL level to line code.

* * * * *